(12) United States Patent
Adachi

(10) Patent No.: US 11,857,080 B2
(45) Date of Patent: Jan. 2, 2024

(54) SHEET FASTENER

(71) Applicant: YKK CORPORATION, Tokyo (JP)

(72) Inventor: Takefumi Adachi, Tokyo (JP)

(73) Assignee: YKK CORPORATION

( * ) Notice: Subject to any disclaimer, the term of this patent is extended or adjusted under 35 U.S.C. 154(b) by 613 days.

(21) Appl. No.: 17/055,566

(22) PCT Filed: May 25, 2018

(86) PCT No.: PCT/JP2018/020133
§ 371 (c)(1),
(2) Date: Nov. 14, 2020

(87) PCT Pub. No.: WO2019/225001
PCT Pub. Date: Nov. 28, 2019

(65) Prior Publication Data
US 2021/0112993 A1    Apr. 22, 2021

(51) Int. Cl.
*A47C 31/02* (2006.01)
*B68G 7/12* (2006.01)
*A44B 13/00* (2006.01)

(52) U.S. Cl.
CPC ............... *A47C 31/02* (2013.01); *B68G 7/12* (2013.01); *A44B 13/0052* (2013.01)

(58) Field of Classification Search
CPC ........ A47C 31/02; A47C 31/023; B68G 7/12; A44B 13/0052; Y02A 40/25
See application file for complete search history.

(56) References Cited

U.S. PATENT DOCUMENTS 4,472,862 A * 9/1984 Bloomfield ........... F16B 5/0692
160/395
2005/0081771 A1    4/2005 Kromm et al.
(Continued)

FOREIGN PATENT DOCUMENTS

CN    101076269 A    11/2007
CN    103857308 A    6/2014
(Continued)

OTHER PUBLICATIONS

YKK Corporation; Office Action for Chinese patent application No. 201880092765.9, dated May 26, 2022, 21 pgs.
Hayashi, Tsukasa; Office Action for Japanese patent application No. 2020-520981, dated Aug. 16, 2022, 6 pgs.
(Continued)

*Primary Examiner* — David M Upchurch
(74) *Attorney, Agent, or Firm* — Taylor English Duma LLP

(57) ABSTRACT

A sheet fastener includes a first fastening member having a long size and a second fastening member having a long size. The first fastening member includes: a first main body portion including a secured surface; a first engagement portion; a plurality of first slit portions formed along an intersecting direction; and a first continuous portion continuous along a longitudinal direction. The second fastening member includes: a second main body portion including a secured surface; a second engagement portion; a plurality of second slit portions formed along an intersecting direction; and a second continuous portion continuous along a longitudinal direction. By using the sheet fastener according to the present invention, the sheet edge portion, which is curved, of the second sheet member can be easily and smoothly fastened with the sheet edge portion, which is curved, of the first sheet member.

20 Claims, 16 Drawing Sheets

(56) References Cited

U.S. PATENT DOCUMENTS

| | | | |
|---|---|---|---|
| 2008/0052881 A1 | 3/2008 | Oertel | |
| 2015/0047158 A1* | 2/2015 | Toribuchi | A47C 31/023 24/700 |
| 2018/0310721 A1* | 11/2018 | Schmitz | A47C 7/36 |
| 2019/0357636 A1* | 11/2019 | Utaka | F16B 45/00 |
| 2021/0053472 A1* | 2/2021 | Eldridge | A47C 31/023 |

FOREIGN PATENT DOCUMENTS

| | | |
|---|---|---|
| CN | 207252946 U | 4/2018 |
| JP | S61191307 | 8/1986 |
| JP | S63194605 | 12/1988 |
| JP | H0387498 | 9/1991 |
| JP | H0635721 | 9/1994 |
| JP | 3863789 | 12/2006 |
| JP | 3128358 | 1/2007 |
| JP | 2009148407 | 7/2009 |
| JP | 2014117289 | 6/2014 |
| JP | 5740480 | 6/2015 |

OTHER PUBLICATIONS

Hayashi, Tsukasa; Office Action for Japanese patent application No. 2020-520981, dated Mar. 29, 2022, 8 pgs.
Hayashi, Tsukasa; Office Action for Japanese patent application No. 2020-520981, dated Sep. 14, 2021, 8 pgs.
Adachi, Takefumi; International Search Report and Written Opinion for PCT/JP2018/020133, filed May 25, 2018, dated Jul. 10, 2018, 26 pgs.

* cited by examiner

SHEET FASTENER

TECHNICAL FIELD

The present invention relates to a sheet fastener for fastening sheet edge portions of a pair of sheet members together.

BACKGROUND ART

For example, a seat for a vehicle such as an automobile or a railroad includes portions of a seat surface portion, a back surface portion, a headrest, an armrest, and the like. Each of these portions constituting the seat is formed with a cushion body (also referred to as a base material) made of synthetic resin foam, and a sheet member such as a cover member or a skin member for covering the surface of the cushion body, in many cases.

In addition, when an operation of covering and attaching the sheet members over the cushion body is performed, the sheet edge portions facing each other of a pair of sheet members are overlapped and fastened together, in some cases. In such cases, a sheet fastener is used to fasten and join the sheet edge portion of one sheet member with the sheet edge portion of the other sheet member, and to maintain the fastened state of the sheet edge portions. By using such a sheet fastener, the operation of fastening the sheet edge portions together can be performed relatively easily. Further, since the joined parts of the sheet members can be finished relatively beautifully, the appearance quality of the product can be improved.

In addition to the above-described vehicle seats, such a sheet fastener is often used for products in which the sheet members are covered on the surface, such as seats for aircrafts and ships, seats used in schools and office buildings, cushions for exercise tools, furniture such as sofas and beds for residences. Further, the usage of the sheet fastener is not limited to the sheet members that cover the surface of the cushion body and the like. The sheet fastener may be used for fastening the sheet edge portions of a structural object such as a tent, or may be used for fastening the edge portions of a package cover for transportation.

An example of the sheet fastener used for such sheet members is disclosed in, for example, JP 5740480 B2 (Patent Literature 1).

The sheet fastener of Patent Literature 1, although its illustration is omitted, includes a first fastening member made of a synthetic resin to be secured to a sheet edge portion of a first sheet member, and a second fastening member made of a synthetic resin to be secured to a sheet edge portion of a second sheet member.

The first fastening member of Patent Literature 1 includes a first secure portion to be secured to the sheet edge portion, and a first engagement portion integrally provided with an end portion of the first secure portion. The first engagement portion has a substantially letter C shape, when a cross section perpendicular to a longitudinal direction of the first fastening member is viewed. In addition, the first engagement portion includes a first engagement base end portion extending from a first main body portion and disposed in parallel with the first main body portion, a first engagement extension portion extending while bending from an end portion of the first engagement base end portion, and a first protrusion portion protruding from the first engagement base end portion. On the other hand, the second fastening member includes a second secure portion to be secured to the sheet edge portion, and a second engagement portion continuous with an end of the second secure portion and having a letter U or C shape in a cross section.

By using such a sheet fastener of Patent Literature 1, the operation of fastening the second sheet member with the first sheet member can be performed smoothly and efficiently. In addition, in Patent Literature 1, the second fastening member is held in a temporary holding state where the second fastening member is temporarily locked to the first fastening member. Then, by rotating the second fastening member in the temporary holding state toward the first fastening member, the second fastening member is locked to the first fastening member in a permanent holding state. Accordingly, a wrinkle or the like becomes unlikely to occur in the first sheet member and the second sheet member that have been fastened together, and the first sheet member and the second sheet member can be attached to a product beautifully.

Further, for example, JP 3863789 B2 (Patent Literature 2) discloses a trim cover attachment member to be attached to an end portion of a trim cover (sheet member) and locked to a lock portion provided on a seat frame of a seat. The trim cover attachment member disclosed in Patent Literature 2 will be briefly described with reference to FIGS. 22 to 24.

The trim cover attachment member 80 of Patent Literature 2 is used for a seat cushion 90 as illustrated in FIG. 22. The seat cushion 90 is formed with a seat frame 91, a pad material 92 to be attached to the seat frame 91, a trim cover 93 to cover the pad material 92, and the like. A tip end portion of the seat frame 91 is formed to protrude with respect to the pad material 92, and a lock portion 94, which is formed to be bent into a letter U shape, is provided at the tip end portion that protrudes. On the other hand, a hook member 80 having a letter J shape as the trim cover attachment member is sewn to a terminal portion 93a of the trim cover 93.

As illustrated in FIGS. 23 and 24, the hook member (trim cover attachment member) 80 of Patent Literature 2 includes an attachment surface portion 81, to which the terminal portion 93a of the trim cover 93 is sewn, a hook surface portion 82, which is located to face the attachment surface portion 81, a hook 83, which is provided at an upper end of the hook surface portion 82, and a bottom surface portion 84, which connects a lower end of the attachment surface portion 81 and a lower end of the hook surface portion 82.

A part of the hook member 80 is provided with a cut-out portion 85, in which an upper end of the hook surface portion 82 is cut out, and a punch-out portion 86 having a circular shape, in which the attachment surface portion 81 is partially punched out. A plurality of the cut-out portions 85 and a plurality of the punch-out portions 86 are provided at predetermined intervals in the longitudinal direction of the hook member 80 by a punching process. By providing the cut-out portions 85 and the punch-out portions 86, the hook member 80 can be curved easily in a direction perpendicular to the attachment surface portion 81, to which the trim cover 93 is sewn, as illustrated in FIG. 24.

By using such a hook member (trim cover attachment member) 80 of Patent Literature 2, the trim cover attachment member 80 can be curved easily in the direction perpendicular to the attachment surface portion 81 in accordance with the curved state of a corner portion of the seat frame 91. Hence, the hook member 80 can be locked to the lock portion 94 of the seat frame 91 while following the corner portion of the seat frame 91. Accordingly, since the trim cover 93 can cover the corner portion of the seat cushion 90, the appearance quality at the corner portion of the seat can be improved.

CITATION LIST

Patent Literature

Patent Literature 1: JP 5740480 B2
Patent Literature 2: JP 3863789 B2

SUMMARY OF INVENTION

Technical Problem

In the case where, for example, a plurality of sheet members such as a first sheet member and a second sheet member are connected and covered on a vehicle seat, depending on the shape and design of the seat, there may be a demand for forming a part or the entirety of a sheet edge portion of the first sheet member and a part or the entirety of a sheet edge portion of the second sheet member in curved forms in directions parallel to the sheet edge portions, and additionally fastening the sheet edge portion, which is curved, of the second sheet member with the sheet edge portion, which is curved, of the first sheet member.

However, in the sheet fastener disclosed in above Patent Literature 1, for example, the first fastening member secured to the first sheet member and the second fastening member secured to the second sheet member are both long-sized members with transverse sections perpendicular to the longitudinal direction exhibiting constant shapes over the entire longitudinal direction. Hence, the first fastening member and the second fastening member cannot be curved. For this reason, in the case where the curved sheet edge portion of the second sheet member is fastened with the curved sheet edge portion of the first sheet member, the first fastening member and the second fastening member are cut to be short. By attaching a plurality of small pieces, which have been cut, of the first fastening member and the second fastening member to the curved first sheet member and the curved second sheet member respectively intermittently, the curved parts of the sheet edge portions can be fastened together.

In this case, however, the operation of attaching the plurality of small pieces of the first fastening member and the second fastening member to the first sheet member and the second sheet member respectively becomes complicated. Moreover, the plurality of small pieces of the first fastening member and the second fastening member attached intermittently generate a relatively large uneven pattern with a part where the small pieces of the first fastening member and the second fastening member are attached and a part where no small piece is attached. Such an uneven pattern generated in this manner is easily visible on the outer surface of the sheet, when the second sheet member is fastened with the first sheet member. As a result, there is a drawback that the appearance quality of the seat is degraded.

On the other hand, in the case of the trim cover attachment member (hook member) 80 disclosed in above Patent Literature 2, the trim cover attachment member 80 can be curved in a direction perpendicular to the attachment surface portion 81 of the trim cover attachment member 80 as described above. However, the trim cover attachment member 80 cannot be curved in a direction parallel to the attachment surface portion 81 due to the form of the trim cover attachment member 80. Therefore, even in the case where the trim cover attachment member 80 disclosed in above Patent Literature 2 is used, it is conceivable that a similar drawback as the case of above Patent Literature 1 occurs, when the curved sheet edge portion of the second sheet member is fastened with a part in which the sheet edge portion of the first sheet member has been curved in parallel with the sheet edge portion.

The present invention has been made in view of the above drawback, and has an object to provide a sheet fastener, by which a sheet edge portion of a second sheet member in a curved state in a direction parallel to a sheet edge portion of a first sheet member can be fastened with the sheet edge portion of the first sheet member, and an uneven pattern can be prevented from appearing or become unlikely to appear on the surface of a curved part.

Solution to Problem

In order to achieve the above object, a sheet fastener provided by the present invention, as the most primary characteristics, includes: a first fastening member having a long size and configured to be secured to a sheet edge portion of a first sheet member; and a second fastening member having a long size and configured to be secured to a sheet edge portion of a second sheet member, wherein the second fastening member is engaged with the first fastening member to enable the second sheet member to be fastened with the first sheet member, wherein the first fastening member includes: a first main body portion including a secured surface being flat and configured to be secured to the first sheet member; a first engagement portion integrally provided at an end portion of the first main body portion and configured to accommodate and engage a part of the second fastening member in an inside; a plurality of first slit portions formed along an intersecting direction that intersects a longitudinal direction of the first fastening member; and a first continuous portion continuous along the longitudinal direction of the first fastening member, and wherein a plurality of the first slit portions are arranged such that the first fastening member is enabled to curve in a direction parallel to the secured surface of the first main body portion.

In this case, it is preferable that the second fastening member includes: a second main body portion including a secured surface being flat and configured to be secured to the second sheet member; a second engagement portion extending from an end portion of the second main body portion and configured to be engaged in the first engagement portion; a plurality of second slit portions formed along an intersecting direction that intersects a longitudinal direction of the second fastening member; and a second continuous portion continuous along the longitudinal direction of the second fastening member, and a plurality of the second slit portions are arranged such that the second fastening member is enabled to curve in a direction parallel to the secured surface of the second main body portion.

Next, a sheet fastener provided by the present invention, as the most primary characteristics, includes: a first fastening member having a long size and configured to be secured to a sheet edge portion of a first sheet member; and a second fastening member having a long size and configured to be secured to a sheet edge portion of a second sheet member, wherein the second fastening member is engaged with the first fastening member to enable the second sheet member to be fastened with the first sheet member, wherein the second fastening member includes: a second main body portion including a secured surface being flat and configured to be secured to the second sheet member; a second engagement portion extending from an end portion of the second main body portion and configured to be engaged in the first fastening member; a plurality of second slit portions formed along an intersecting direction that intersects a longitudinal direction of the second fastening member; and a second continuous portion continuous along the longitudinal direction of the second fastening member, and wherein a plurality of the second slit portions are arranged such that the second fastening member is enabled to curve in a direction parallel to the secured surface of the second main body portion.

In this case, it is preferable that the first fastening member includes: a first main body portion including a secured surface being flat and configured to be secured to the first sheet member; a first engagement portion integrally provided at an end portion of the first main body portion and configured to accommodate and engage a part of the second engagement portion in an inside; a plurality of first slit portions formed along an intersecting direction that intersects a longitudinal direction of the first fastening member; and a first continuous portion continuous along the longitudinal direction of the first fastening member, and a plurality of the first slit portions are arranged such that the first fastening member is enabled to curve in a direction parallel to the secured surface of the first main body portion.

In the above-described sheet fastener according to the present invention, it is preferable that in a case where a first slit width dimension represents a dimension in the longitudinal direction of the first slit portion, a first slit separation interval represents a distance between the first slit portions adjacent to each other in the longitudinal direction, a second slit width dimension represents a dimension in the longitudinal direction of the second slit portion, and a second slit separation interval represents a distance between the second slit portions adjacent to each other in the longitudinal direction, the first slit width dimension is set to be smaller than the second slit separation interval and the second slit width dimension is set to be smaller than the first slit separation interval.

In this case, it is further preferable that the first slit width dimension is set to be smaller than the second slit separation interval in 50% or more of the first slit portions, and the second slit width dimension is set to be smaller than the first slit separation interval in 50% or more of the second slit portions.

Furthermore, it is preferable that a plurality of the first slit portions and a plurality of the second slit portions are respectively formed in the longitudinal directions of the first fastening member and the second fastening member at a pitch interval that is constant, and the pitch interval of the first slit portion and the pitch interval of the second slit portion are set to an identical size.

In addition, in the sheet fastener according to the present invention, it is preferable that the first engagement portion of the first fastening member has a substantially letter U shape or a substantially letter C shape in a transverse section perpendicular to the longitudinal direction of the first fastening member, and in the first engagement portion, an accommodation space portion arranged in the inside of the first engagement portion and configured to accommodate at least a part of the second engagement portion, and an opening portion configured to communicate with the accommodation space portion are provided along the longitudinal direction of the first fastening member.

In this case, it is preferable that the first continuous portions of the first fastening member are adjacent to the opening portion in the first engagement portion, and are provided in at least a pair of opening adjacent end portions disposed to face each other via the opening portion.

Furthermore, in the sheet fastener according to the present invention, it is preferable that when the first fastening member is viewed from a direction perpendicular to the secured surface of the first main body portion, the first slit portions include: a plurality of main body side first slit portions formed continuously along the intersecting direction from an end edge on a side where the first main body portion is disposed in the first fastening member; and a plurality of engagement side first slit portions formed continuously along the intersecting direction from an end edge on a side where the first engagement portion is disposed in the first fastening member, and a plurality of the main body side first slit portions and a plurality of the engagement side first slit portions are formed at identical locations to each other in the longitudinal direction of the first fastening member.

In the present invention, it is preferable that when the second fastening member is viewed from a direction perpendicular to the secured surface of the second main body portion, the second continuous portion is provided at an end edge portion on a side where the second main body portion is disposed in the second fastening member, and the second slit portions are continuously formed along the intersecting direction from an end edge on a side where the second engagement portion is disposed in the second fastening member.

Furthermore, in the present invention, it is preferable that the second engagement portion of the second fastening member has a substantially letter U shape in a transverse section perpendicular to the longitudinal direction of the second fastening member, and the second engagement portion includes: a second base end wall portion bending and extending from the second main body portion; a second intermediate wall portion bending and extending from the second base end wall portion; and a second tip end wall portion bending and extending from the second intermediate wall portion.

In addition, in the present invention, it is possible that the second engagement portion of the second fastening member has a substantially letter T shape in a transverse section perpendicular to the longitudinal direction of the second fastening member, and the second engagement portion includes: a neck portion connected with the second main body portion and extending in a direction inclined with respect to the second main body portion; an engagement head portion disposed at a tip end portion of the neck portion and extending in an intersecting direction with respect to the neck portion; an abutment portion disposed at a base end portion of the neck portion and configured to be abutted by the first fastening member; and an insertion groove portion recessed between the abutment portion and the engagement head portion.

Advantageous Effects of Invention

In the sheet fastener provided by the present invention as described above, the plurality of first slit portions are formed in the first fastening member, so that the first fastening member can be curved in the direction parallel to the secured surface of the first main body portion (in other words, can be curved in the direction parallel to the sheet edge portion of the first sheet member). In addition, the plurality of second slit portions are formed in the second fastening member, so that the second fastening member can be curved in the direction parallel to the secured surface of the second main body portion (in other words, can be curved in the direction parallel to the sheet edge portion of the second sheet member).

Therefore, for example, in a case where the sheet edge portion of the first sheet member and the sheet edge portion of the second sheet member are formed in curved forms in the directions parallel to the sheet edge portions, by using the sheet fastener according to the present invention, the first fastening member and the second fastening member can be curved and secured stably to the respective sheet edge portions of the first sheet member and the second sheet member in long-sized states, without the first fastening member and the second fastening member being cut to be short, for example, as in the case of Patent Literature 1 described above. In addition, by engaging the second fastening member secured to the second sheet member with the first fastening member secured to the first sheet member, the sheet edge portion, which is curved, of the second sheet member can be fastened easily and smoothly with the sheet edge portion, which is curved, of the first sheet member. As a result, for example, since there is no uneven pattern generated by small pieces of the first fastening member and the second fastening member that have been cut to be short as in the conventional case, degradation in the appearance quality of a product resulting from the uneven pattern can be prevented.

In such a sheet fastener according to the present invention, in the case where the first slit width dimension represents the dimension in the longitudinal direction of the first slit portion, the first slit separation interval represents the distance between the first slit portions adjacent to each other in the longitudinal direction, the second slit width dimension represents the dimension in the longitudinal direction of the second slit portion, and the second slit separation interval represents the distance between the second slit portions adjacent to each other in the longitudinal direction, the first slit width dimension is set to be smaller than the second slit separation interval in at least a part of the first slit portions. Moreover, also in at least a part of the second slit portions, the second slit width dimension is set to be smaller than the first slit separation interval.

Accordingly, when the second fastening member is engaged with the first fastening member, a part (first engagement portion) of the first fastening member can be effectively prevented from entering the second slit portion of the second fastening member, and a part (second engagement portion) of the second fastening member can be effectively prevented from entering the first slit portion of the first fastening member. For example, when the first fastening member and the second fastening member move relative to each other in the longitudinal direction or the like, the first and second fastening members become unlikely to be caught with each other.

Particularly in this case, the above-described first slit width dimension is set to be smaller than the second slit separation interval in 50% or more of the first slit portions (that is, more than half in number of the first slit portions) formed in the first fastening member, preferably in the entirety of the first slit portions. In addition, the above-described second slit width dimension is set to be smaller than the first slit separation interval in 50% or more of the second slit portions formed in the second fastening member, preferably in the entirety of the second slit portions. Accordingly, even when the first fastening member and the second fastening member move relative to each other in the longitudinal direction in the state that the second fastening member is engaged with the first fastening member, the first fastening member and the second fastening member become further unlikely to be caught with each other.

In the sheet fastener according to the present invention as described above, the plurality of first slit portions and the plurality of second slit portions are formed at a constant pitch interval in the longitudinal direction. Further, the pitch interval of the first slit portions and the pitch interval of the second slit portions are set to the same size. Accordingly, the first fastening member and the second fastening member can be easily curved with similar curvatures with each other in a predetermined parallel direction described above. Accordingly, for example, with the first fastening member that is curved, the second fastening member that is curved, can be smoothly engaged in the same manner, thus the second sheet member can be fastened stably to the first sheet member.

Further, in the sheet fastener according to the present invention, the first engagement portion of the first fastening member has a substantially letter U shape or a substantially letter C shape in a transverse-sectional view. In addition, the first engagement portion is provided with an accommodation space portion that accommodates at least a part of the second engagement portion, and an opening portion that communicates with the accommodation space portion, in the longitudinal direction. Accordingly, the second engagement portion of the second fastening member can be smoothly and stably engaged with the first engagement portion of the first fastening member. It is to be noted that the first engagement portion of the first fastening member in the present invention may have, instead of a substantially letter U shape or a substantially letter C shape in a transverse-sectional view, any other shape including a part that winds locally.

Further, in this case, the first continuous portion of the first fastening member is provided in at least at a pair of opening adjacent end portions adjacent to the opening portion and facing each other via the opening portion in the first engagement portion. In this manner, in the first fastening member according to the present invention, the first continuous portion is provided in the pair of opening adjacent end portions in the first engagement portion, and no first slit portion is formed in the pair of opening adjacent end portions. Accordingly, in inserting and engaging the second engagement portion of the second fastening member into the accommodation space portion via the above-described opening portion of the first fastening member, for example, even with the provision of the plurality of second slit portions in the second engagement portion of the second fastening member, the second engagement portion can be smoothly inserted into the accommodation space portion of the first engagement portion and stably engaged with the first engagement portion without being hooked by the above-described pair of opening adjacent end portions of the first engagement portion.

Furthermore, in the sheet fastener according to the present invention, when the first fastening member is viewed from a direction perpendicular to the secured surface of the first main body portion, the first slit portions include a plurality of main body side first slit portions continuously formed along the intersecting direction from an end edge of the first main body portion to a formation part of the first continuous portion, and a plurality of engagement side first slit portions continuously formed along the intersecting direction from an end edge of the first engagement portion to the formation part of the first continuous portion. In addition, the plurality of main body side first slit portions and the plurality of engagement side first slit portions are formed at a constant pitch interval at the same locations corresponding to each other in the longitudinal direction. Accordingly, the first fastening member can be easily curved in the direction parallel to the secured surface of the first main body portion. Further, the second engagement portion of the second fastening member can be smoothly and stably engaged with the first engagement portion of the first fastening member.

In the present invention, when the second fastening member is viewed from the direction perpendicular to the secured surface of the second main body portion, the second continuous portion is provided at the end edge portion of the second main body portion. The second slit portions are continuously formed along the intersecting direction from the end edge of the second engagement portion to a formation part of the second continuous portion. Accordingly, the second fastening member can be easily curved in the direction parallel to the secured surface of the second main body portion. Further, when the second fastening member is engaged with the first fastening member to fasten the second sheet member with the first sheet member, the second sheet member can be folded back along the second continuous portion. Thus, since a small uneven pattern due to the presence or absence of the second slit portion does not appear on a folded-back part of the second sheet member, the folded-back part of the second sheet member can be finished with a smooth surface with no unevenness or little unevenness.

Furthermore, in the present invention, the second engagement portion of the second fastening member includes the second base end wall portion, the second intermediate wall portion, and the second tip end wall portion, and these wall portions constitute a substantially letter U shape in a transverse section. Accordingly, the second fastening member can be smoothly and stably engaged with the first engagement portion of the first fastening member.

In addition, in the present invention, the second engagement portion of the second fastening member may have a substantially letter T shape in a transverse section. In this case, the second engagement portion includes the neck portion inclined with respect to the second main body portion, the engagement head portion disposed at the tip end portion of the neck portion, the abutment portion disposed at the base end portion of the neck portion and configured to be abutted by the first fastening member (in particular, the first engagement portion of the first fastening member), and the insertion groove portion recessed between the abutment portion and the engagement head portion.

Accordingly, the second engagement portion of the second fastening member can be smoothly and stably engaged with the first engagement portion of the first fastening member. Furthermore, in this case, after engaging the second engagement portion with the first engagement portion, by moving the second fastening member so that the tip end portion of the first engagement portion is inserted into the insertion groove portion of the second engagement portion, and further rotating the second fastening member to be separated from the first main body portion of the first fastening member, the second fastening member can be easily and stably removed from the first fastening member.

DESCRIPTION OF EMBODIMENTS

Hereinafter, preferred embodiments of the present invention will be described in detail with reference to the drawings by way of examples. It is to be noted that the present invention is not limited to the embodiments to be described below, and various changes can be made as long as it has substantially the same configuration as the present invention and has the same functions and effects.

First Embodiment

Figure 1:
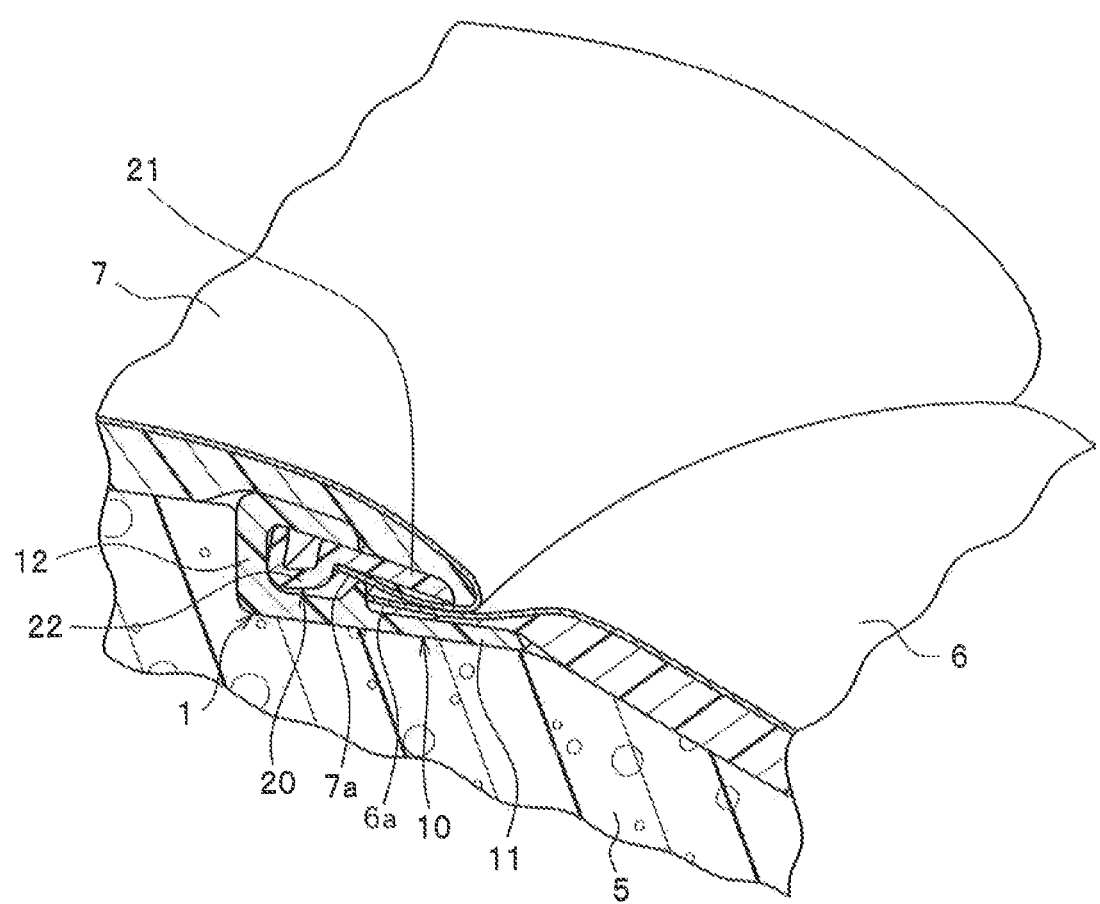
FIG. 1 is a schematic diagram schematically illustrating a state where sheet members are fastened by using a sheet fastener according to a first embodiment of the present invention.
Figure 2:
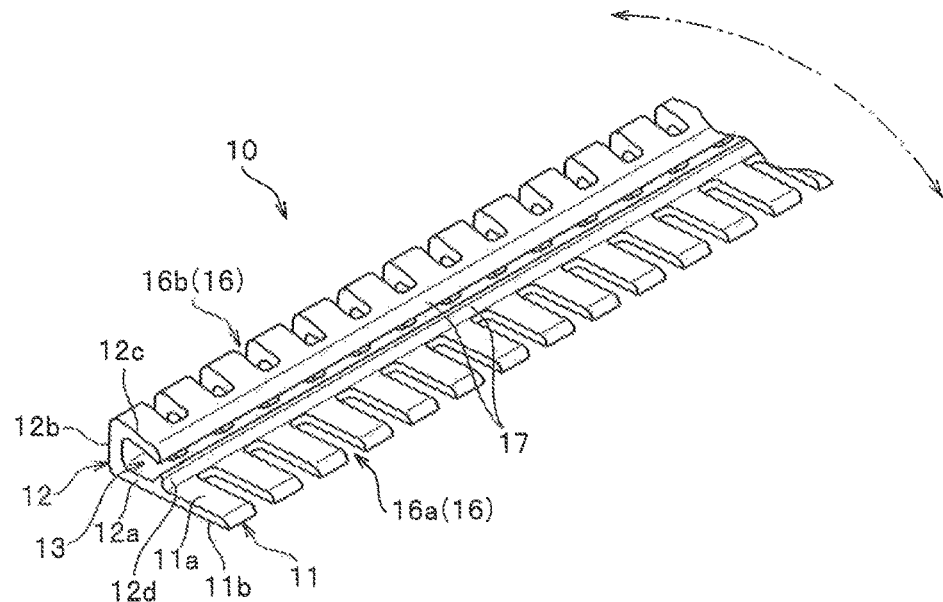
FIG. 2 is a perspective view illustrating a first fastening member of the sheet fastener according to the first embodiment.
Figure 3:
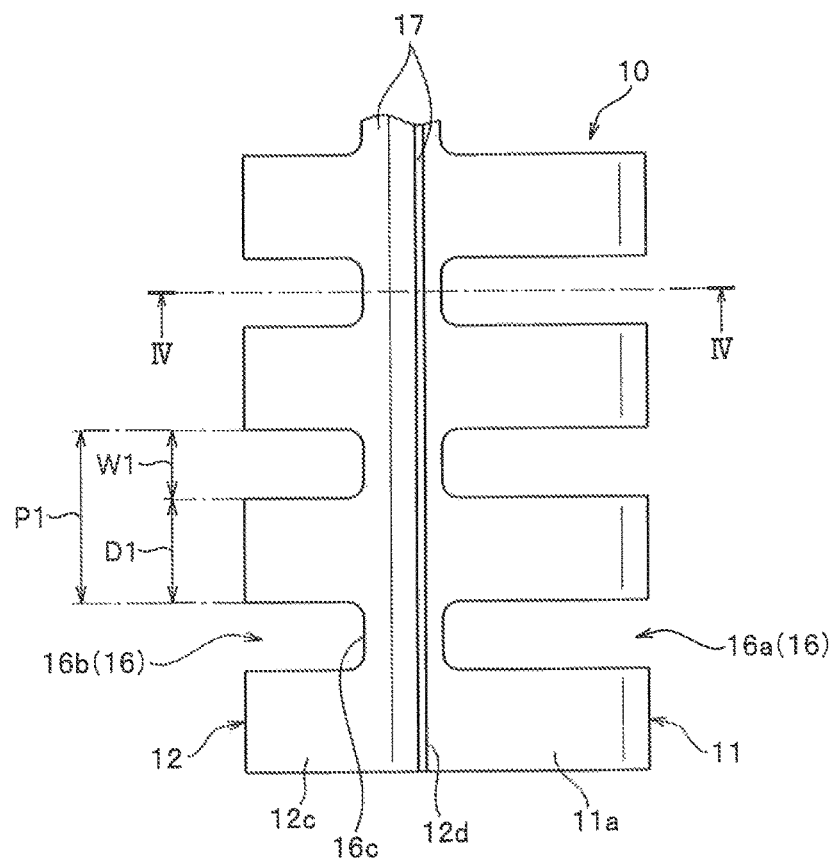
FIG. 3 is a plan view of the first fastening member of FIG. 2, when viewed from a direction perpendicular to a secured surface of a first main body portion.
Figure 4:
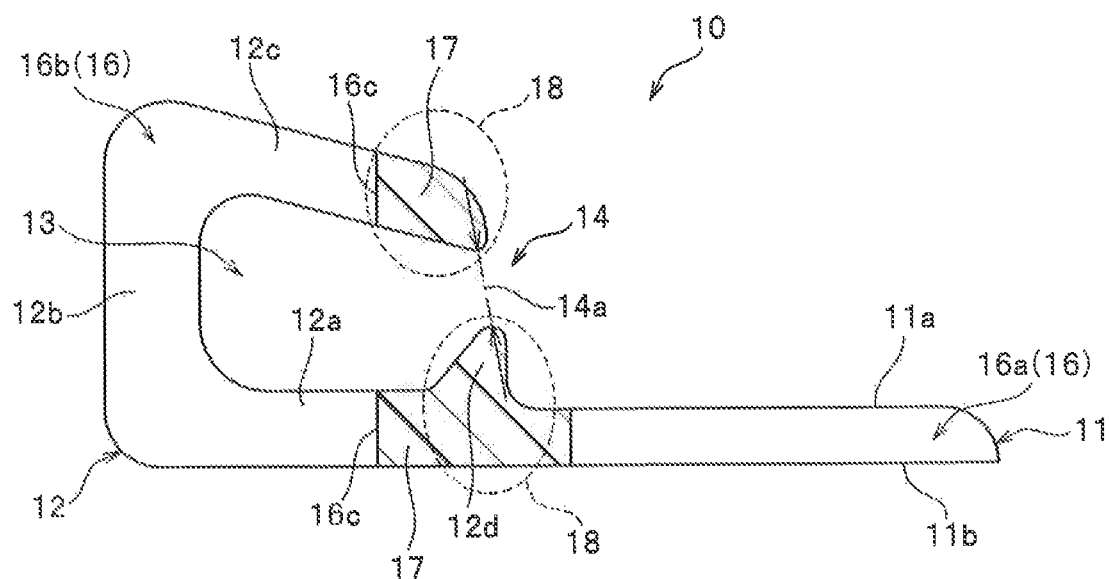
FIG. 4 is a cross-sectional view illustrating a transverse section taken along line IV-IV illustrated in FIG. 3.
Figure 5:
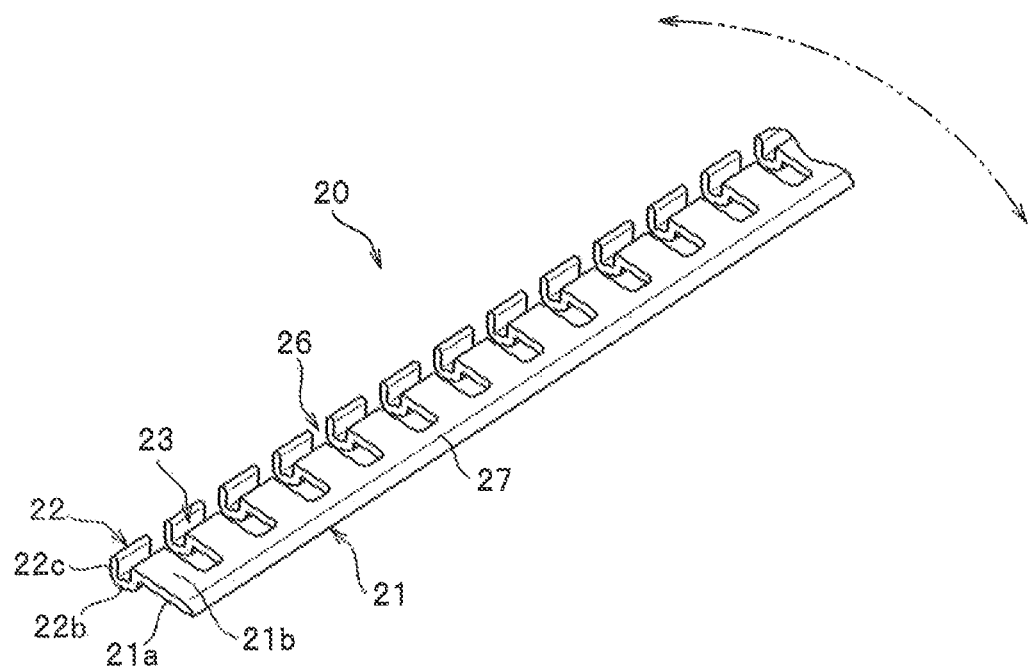
FIG. 5 is a perspective view illustrating a second fastening member of the sheet fastener according to the first embodiment.
Figure 6:
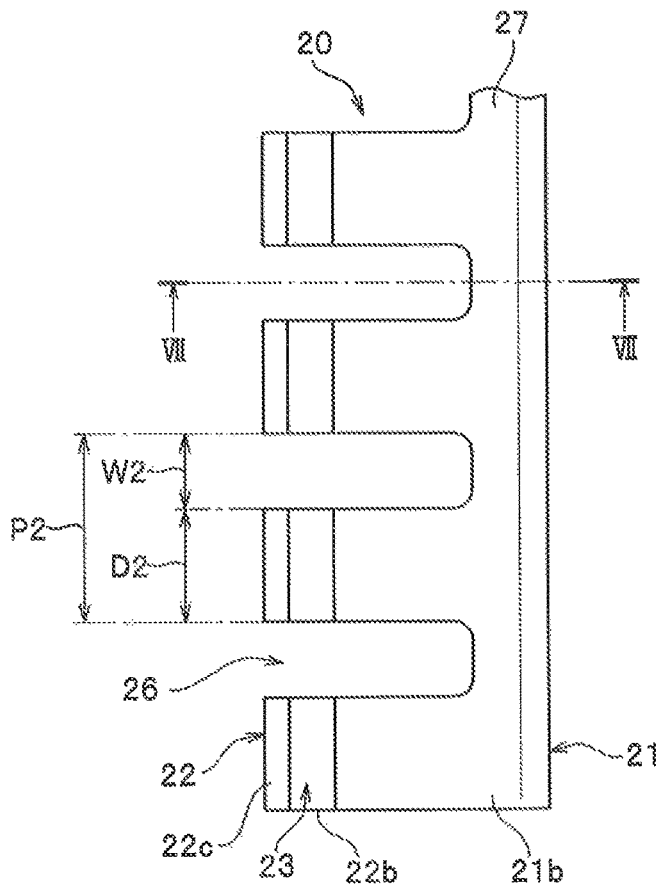
FIG. 6 is a plan view of the second fastening member of FIG. 5, when viewed from a direction perpendicular to a secured surface of a second main body portion.
Figure 7:
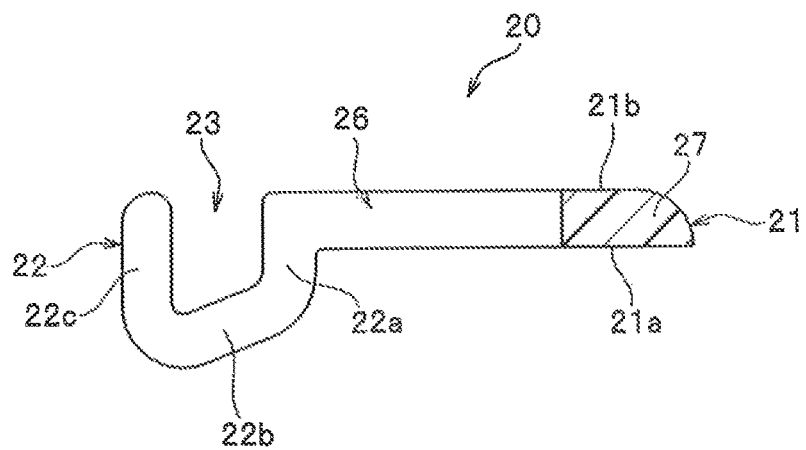
FIG. 7 is a cross-sectional view illustrating a transverse section taken along line VII-VII illustrated in FIG. 6.

FIG. 1 is a schematic diagram schematically illustrating a state where sheet members are fastened by using a sheet fastener according to a present first embodiment. FIGS. 2 to 4 are a perspective view, a plan view, and a cross-sectional view schematically illustrating a first fastening member of the sheet fastener. FIGS. 5 to 7 are a perspective view, a plan view, and a cross-sectional view schematically illustrating a second fastening member of the sheet fastener.

As illustrated in FIG. 1, in covering and attaching a first sheet member 6 and a second sheet member 7, which respectively serve as skin members, over a surface of a cushion body 5, a sheet fastener 1 according to the present first embodiment is used to continuously fasten a sheet edge portion 7a of the second sheet member 7 with a sheet edge portion 6a of the first sheet member 6 in a boundary part between the first sheet member 6 and the second sheet member 7.

Such a sheet fastener 1 according to the present first embodiment is mainly used for seats for vehicles such as automobiles, but can be used in the same manner for products, for example, seats for aircrafts and ships, seats used in schools and office buildings, cushions for exercise tools, furniture such as sofas and beds for residences, and the like.

The sheet fastener 1 according to the present first embodiment includes a first fastening member 10, which is long and narrow, to be secured to the sheet edge portion 6a of the first sheet member 6, and a second fastening member 20, which is long and narrow, to be secured to the sheet edge portion 7a of the second sheet member 7 and to be engaged with the first fastening member 10. In this case, the first fastening member 10 and the second fastening member 20 are respectively referred to as an outer member and an inner member, in some cases. It is to be noted that in the present first embodiment, the longitudinal dimensions (dimensions in the longitudinal direction) of the first fastening member 10 and the second fastening member 20 can be appropriately changed depending on the lengths of the sheet edge portions 6a and 7a of the first sheet member 6 and the second sheet member 7, to which the first fastening member 10 and the second fastening member 20 are respectively secured.

In the present first embodiment, the first fastening member 10 and the second fastening member 20 are respectively produced by performing extrusion molding, injection molding, or the like of a synthetic resin material to form a long-sized primary molded body, and then by performing a cutting process on the obtained primary molded body for forming first slit portions 16 and second slit portions 26 to be described later. The first fastening member 10 and the second fastening member 20 each made of a synthetic resin have elasticity. It is to be noted that, in the present invention, the materials of the first fastening member 10 and the second fastening member 20 are not particularly limited, and can be changed optionally.

In this case, in the molding process of the extrusion molding or injection molding described above, in a case where the direction in which the primary molded body is molded and conveyed is defined as a machine direction (MD), the machine directions in the first fastening member 10 and the second fastening member 20, which are produced from the primary molded body, are longitudinal directions of the first fastening member 10 and the second fastening member 20. Further, as illustrated in FIGS. 2 and 5 and the like, the first fastening member 10 and the second fastening member 20 are formed to extend continuously to be long in one direction. Thus, the longitudinal directions of the first fastening member 10 and the second fastening member 20 can also be referred to as extension directions or length directions of the first fastening member 10 and the second fastening member 20.

The first fastening member 10 according to the present first embodiment includes a first main body portion 11, which is secured to the sheet edge portion 6a of the first sheet member 6, a first engagement portion 12, which is integrally provided with a one end portion of the first main body portion 11, an accommodation space portion 13, which is arranged inside the first engagement portion 12 and which accommodates a part of the second fastening member 20, and an opening portion 14, which opens at a part of the first engagement portion 12, and which communicates with the accommodation space portion 13.

The first main body portion 11 of the first fastening member 10 is formed to have a flat plate shape that is long and narrow in the longitudinal direction. The first main body portion 11 includes a first surface 11a, which has a plane shape and which serves as a secured surface to be secured in contact with the first sheet member 6, and a second surface 11b, which has a plane shape and which is disposed on the opposite side of the first surface 11a.

In this case, the first surface (secured surface) 11a of the first main body portion 11 serves as an outer surface facing outward with respect to the cushion body 5, and the second surface 11b of the first main body portion 11 serves as an inner surface facing the cushion body 5. It is to be noted that in the present invention, from among directions parallel to the first surface (secured surface) 11a of the first main body portion 11, a direction in a longitudinal direction of the first fastening member 10 is referred to as a front-rear direction of the first fastening member 10, and a direction perpendicular to the longitudinal direction of the first fastening member 10 is referred to as a right-left direction of the first fastening member 10, in some cases. Furthermore, a direction perpendicular to the first surface (secured surface) 11a of the first main body portion 11 is referred to as a upper-lower direction of the first fastening member 10, in some cases.

Further, in the first fastening member 10, a tip end portion of the first surface 11a in the first main body portion 11 (an end portion on the side opposite to the side connected with the first engagement portion 12) is formed to have a curved surface or an inclined surface that gradually decreases the thickness dimension of the first main body portion 11 that is the distance between the first surface 11a and the second surface 11b toward a tip end.

The first engagement portion 12 opens on the first main body portion 11 side, and has a substantially letter C shape in a transverse section perpendicular to the longitudinal direction of the first fastening member 10 (FIG. 4). The first engagement portion 12 includes a first base end wall portion 12a, which is formed continuously from the first main body portion 11 and which is disposed in parallel with the first main body portion 11, a first intermediate wall portion 12b, which bends at approximately 90 degrees and extends from the first base end wall portion 12a, a first tip end wall portion 12c, which bends and extends from the first intermediate wall portion 12b, and a first protrusion portion 12d, which protrudes from an end portion of the first base end wall portion 12a adjacent to the first main body portion 11 toward the first tip end wall portion 12c. In this case, the location of an outer wall surface of the first protrusion portion 12d facing the first main body portion 11 is the boundary between the first main body portion 11 and the first engagement portion 12.

The respective thickness dimensions of the first base end wall portion 12a, the first intermediate wall portion 12b, and the first tip end wall portion 12c of the first engagement portion 12 are defined as the minimum distance between an inner peripheral surface and an outer peripheral surface of the first engagement portion 12, when the transverse section of the first fastening member 10 is viewed. In this case, the first base end wall portion 12a, the first intermediate wall portion 12b, and the first tip end wall portion 12c of the first engagement portion 12 are formed to have the thickness dimensions larger than that of the first main body portion 11. In particular, in the present first embodiment, the thickness dimension of the first intermediate wall portion 12b is set to be larger than the thickness dimensions of the first base end wall portion 12a and the first tip end wall portion 12c.

In the transverse section of the first fastening member 10, the first intermediate wall portion 12b is disposed in a direction perpendicular to the first base end wall portion 12a. The first tip end wall portion 12c is disposed so that the angle on the inner peripheral surface side with respect to the first intermediate wall portion 12b is less than 90 degrees. In other words, the first tip end wall portion 12c is disposed to be inclined with respect to the first base end wall portion 12a so as to gradually decrease the gap between the inner peripheral surface of the first base end wall portion 12a and the inner peripheral surface of the first tip end wall portion 12c toward a tip end portion of the first tip end wall portion 12c.

The inner peripheral surface of the first engagement portion 12 disposed to face the accommodation space portion 13 includes a flat surface formed on the first base end wall portion 12a, the first intermediate wall portion 12b, and the first tip end wall portion 12c, a curved surface formed at a connection part between the first base end wall portion 12a and the first intermediate wall portion 12b, a curved surface formed at a connection part between the first intermediate wall portion 12b and the first tip end wall portion 12c, and an inner wall surface, to be described later, of the first protrusion portion 12d.

The first protrusion portion 12d of the first engagement portion 12 has a substantially triangular shape when the transverse section of the first fastening member 10 is viewed. In this case, the first protrusion portion 12d includes an outer wall surface facing the first main body portion 11 side, and the inner wall surface facing the accommodation space portion 13. The outer wall surface of the first protrusion portion 12d is disposed to be perpendicular to the first surface (secured surface) 11a of the first main body portion 11.

The inner wall surface of the first protrusion portion 12d is formed to be an inclined surface that is inclined downward toward the first base end wall portion 12a and that is inclined at an angle of approximately 45 degrees with respect to the inner peripheral surface of the first base end wall portion 12a. Since the inner wall surface of the first protrusion portion 12d is formed to be inclined in this manner, in holding the second fastening member 20 in a temporary engagement state by the first fastening member 10 and then engaging in a permanent engagement state, as will be described later, the entirety of a second engagement portion 22 of the second fastening member 20 can be made to smoothly enter and accommodate the inside of the accommodation space portion 13 of the first engagement portion 12.

The accommodation space portion 13 of the first engagement portion 12 is formed to be surrounded by the first base end wall portion 12a, the first intermediate wall portion 12b, the first tip end wall portion 12c, and the first protrusion portion 12d. The accommodation space portion 13 is formed continuously along the longitudinal direction of the first fastening member 10, and has a size capable of accommodating a part of a second main body portion 21, to be described later, and the second engagement portion 22 of the second fastening member 20.

The opening portion 14, which communicates with the accommodation space portion 13, is arranged between the tip end portion of the first tip end wall portion 12c and a tip end portion of the first protrusion portion 12d in the first engagement portion 12. In this case, since first continuous portions 17, to be described later, are formed at the tip end portion of the first tip end wall portion 12c and the tip end portion of the first protrusion portion 12d, the opening portion 14 is continuously arranged along the longitudinal direction of the first fastening member 10 to be interposed between the two first continuous portions 17.

Figure 9:
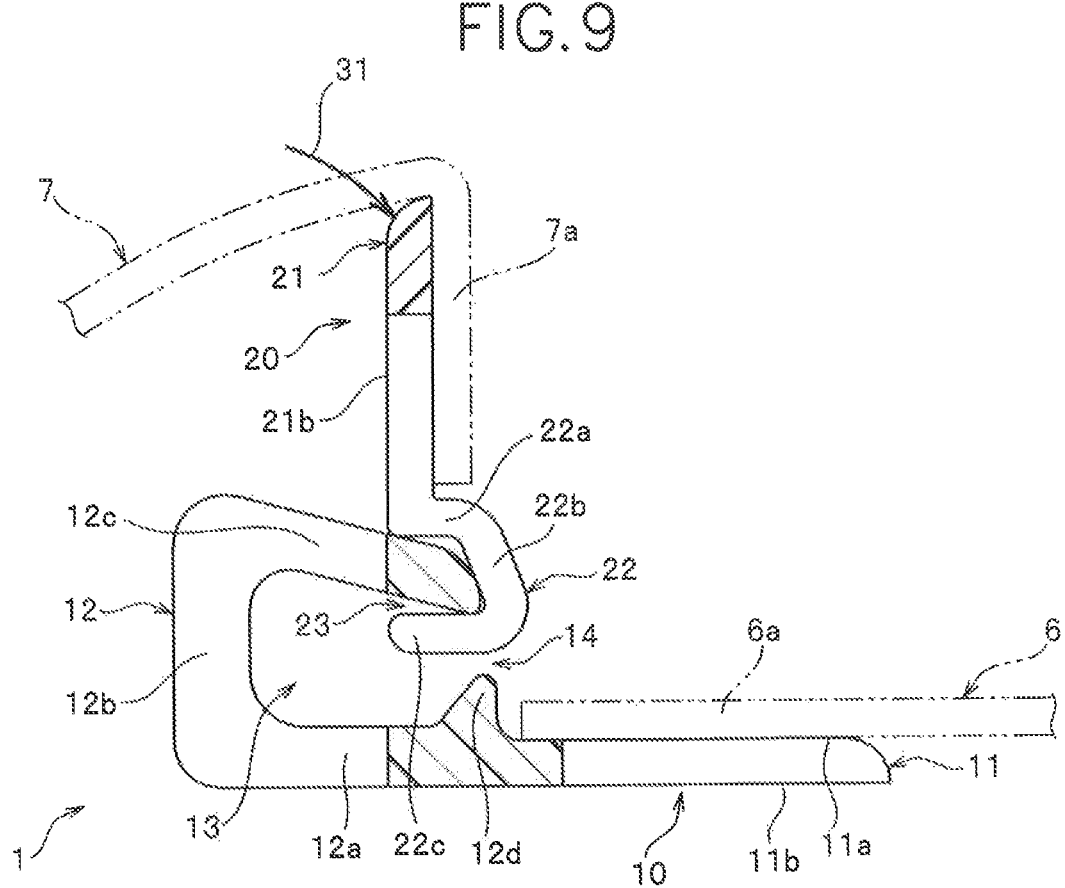
FIG. 9 is a cross-sectional view schematically illustrating a temporary engagement state of the sheet fastener according to the first embodiment.
Figure 10:
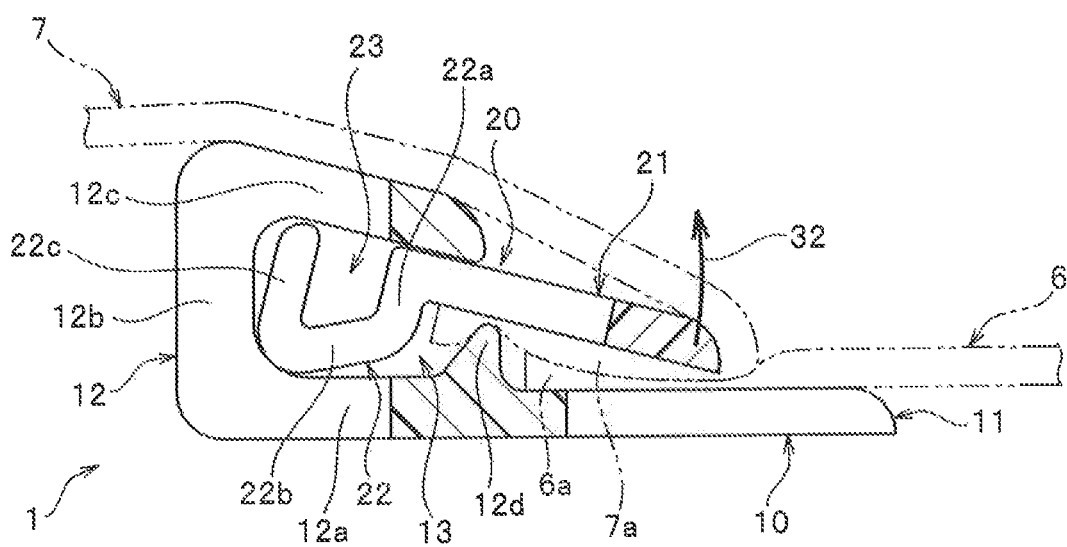
FIG. 10 is a cross-sectional view schematically illustrating a permanent engagement state of the sheet fastener according to the first embodiment.

Here, for example, as illustrated in FIG. 4, in a case where the shortest distance between the tip end portion of the first tip end wall portion 12c and the tip end portion of the first protrusion portion 12d is defined as a size 14a of the opening portion 14, the size 14a of the opening portion 14 in the first fastening member 10 is set to be larger than the thickness dimension of the second engagement portion 22 and the thickness dimension of the second main body portion 21 in the second fastening member 20 so that the second engagement portion 22 and the second main body portion 21 in the second fastening member 20 can be inserted, for example, as illustrated in FIGS. 9 and 10.

In the first fastening member 10 according to the present first embodiment, there are formed the plurality of first slit portions 16, which are formed along a perpendicular direction perpendicular to the longitudinal direction of the first fastening member 10 (an intersecting direction that intersects the longitudinal direction at an angle of 90 degrees), and the first continuous portions 17, which are continuously connected along the longitudinal direction of the first fastening member 10, as parts where no first slit portion 16 is provided.

It is to be noted that as described above, the first slit portions 16 are provided along the above perpendicular direction. However, the first slit portions 16 according to the present first embodiment may be formed in a direction that is not parallel to the longitudinal direction of the first fastening member 10, that is, may be formed along an intersecting direction that intersects the longitudinal direction of the first fastening member 10 at a predetermined angle other than 90 degrees (for example, 45 degrees).

In the present first embodiment, the plurality of first slit portions 16 are provided in a form (location, shape, and size) that the first fastening member 10 can be curved in the right-left direction parallel to the first surface (secured surface) 11a of the first main body portion 11.

To be specific, the plurality of first slit portions 16 in the present first embodiment are formed in parallel with one another at a constant pitch interval P1 in the longitudinal direction of the first fastening member 10. In this case, the formation pitch interval P1 of the first slit portions 16 has a total size of a first slit width dimension W1, which is a dimension of the first slit portion 16 in the longitudinal direction, and a first slit separation interval D1, which is a distance between the first slit portions 16 adjacent to each other in the longitudinal direction. In addition, the first slit width dimension W1 is set to be smaller than the first slit separation interval D1.

The first slit portion 16 of the first fastening member 10 includes a main body side first slit portion 16a provided in the first main body portion 11, and an engagement side first slit portion 16b provided in the first engagement portion 12, in a plan view when the first fastening member 10 is viewed from the upper-lower direction perpendicular to the secured surface 11a of the first main body portion 11 (refer to FIG. 3).

In particular, the first slit portions 16 each include a pair of the main body side first slit portion 16a and the engagement side first slit portion 16b. The pair of the main body side first slit portion 16a and the engagement side first slit portion 16b are formed to correspond to each other at the same locations in the longitudinal direction of the first fastening member 10.

The main body side first slit portion 16a is linearly arranged from a tip end edge of the first main body portion 11 to the vicinity of the first engagement portion 12. In the above-described plan view of the first fastening member 10 (FIG. 3), the dimension of the main body side first slit portion 16a in the perpendicular direction (right-left direction perpendicular to the longitudinal direction) is preferably formed to occupy a range of 70% or more, in particular 80% or more of the dimension in the perpendicular direction of the first main body portion 11 from the tip end edge of the first main body portion 11.

The engagement side first slit portion 16b is arranged continuously in a part of the first base end wall portion 12a, the first intermediate wall portion 12b, and a part of the first tip end wall portion 12c in the first engagement portion 12. In addition, the engagement side first slit portion 16b is disposed, in the above-described plan view of the first fastening member 10, from an end edge on the side where first engagement portion 12 is disposed in the right-left direction of first fastening member 10 (that is, an end edge of the first fastening member 10 on the opposite side of the tip end edge of the first main body portion 11) to the location in the vicinity of the tip end portion of the first tip end wall portion 12c in the first engagement portion 12.

Further, when the transverse section of the first fastening member 10 is viewed (refer to FIG. 4), a slit end face 16c, which is formed on the first base end wall portion 12a, and a slit end face 16c, which is formed on the first tip end wall portion 12c, are provided as end portions of the engagement side first slit portion 16b in the above-described perpendicular direction (right-left direction). In this case, the slit end face 16c formed on the first base end wall portion 12a and the slit end face 16c formed on the first tip end wall portion 12c are disposed at locations that overlap each other in the plan view of the first fastening member 10 (FIG. 3). Accordingly, the first fastening member 10 can be curved more easily in the right-left direction parallel to the first surface 11a of the first main body portion 11, as will be described later.

As illustrated in FIG. 4, for example, the first continuous portions 17 of the first fastening member 10 are formed to be adjacent to the opening portion 14 so as to interpose the opening portion 14 of the first engagement portion 12. That is, the first continuous portions 17 according to the present first embodiment are provided to be separated into an opening adjacent end portion 18 including the tip end portion of the first tip end wall portion 12c, and an opening adjacent end portion 18 including the first protrusion portion 12d, as an upper part and a lower part in the first engagement portion 12, each having a transverse sectional area that ensures appropriate strength. In this case, the upper and lower opening adjacent end portions 18 in the first fastening member 10 are adjacent to the opening portion 14, and face each other via the opening portion 14, as indicated by being surrounded by a broken line in FIG. 4. Further, in the case of the present first embodiment, the first continuous portions 17 are also provided at the end portion on the first base end wall portion 12a which is disposed at a side to be connected with the first main body portion 11 in the first engagement portion 12, and at the end portion on the first main body portion 11 which is disposed at a side to be connected with the first engagement portion 12 (first base end wall portion 12a).

As described above, the plurality of first slit portions 16 and the first continuous portions 17 are provided in the first fastening member 10. Therefore, the first fastening member 10 can be curved easily in the right-left direction parallel to the first surface (secured surface) 11a of the first main body portion 11, with the two first continuous portions 17 disposed in a separated manner in the upper-lower direction as an axis (center), as indicated by a virtual line in FIG. 2 and FIG. 8. Further, the material cost of the first fastening member 10 can be reduced, and the weight of the first fastening member 10 can be reduced.

The second fastening member 20 according to the present first embodiment includes the second main body portion 21 to be secured to the sheet edge portion 7a of the second sheet member 7, the second engagement portion 22 provided integrally with a one end portion of the second main body portion 21, and an inner space portion 23 formed inside the second engagement portion 22.

The second main body portion 21 of the second fastening member 20 is formed to have a flat plate shape that is long and narrow in the longitudinal direction. The second main body portion 21 includes a first surface 21a, which faces the first fastening member 10 when the second fastening member 20 is held by the first fastening member 10 in the permanent engagement state, which has a plane shape, and which serves as a secured surface to be secured in contact with the second sheet member 7, and a second surface 21b, which has a plane shape and which is disposed on the opposite side of the first surface 21a.

In this case, the first surface 21a of the second main body portion 21 serves as an inner surface disposed to face the cushion body 5, and the second surface 21b of the second main body portion 21 serves as an outer surface facing the outer side with respect to the cushion body 5. It is to be noted that in the present invention, from among directions parallel to the first surface (secured surface) 21a of the second main body portion 21, a direction along the longitudinal direction of the second fastening member 20 is referred to as a front-rear direction of the second fastening member 20, and a direction perpendicular to the longitudinal direction of the second fastening member 20 is referred to as a right-left direction of the second fastening member 20, in some cases. Furthermore, a direction perpendicular to the first surface (secured surface) 21a of the second main body portion 21 is referred to as a upper-lower direction of the second fastening member 20, in some cases.

Further, in the second fastening member 20, a tip end portion of the second surface 21b in the second main body portion 21 (an end portion on the side opposite to the side connected with the second engagement portion 22) is formed to have a curved surface or an inclined surface that gradually decreases the thickness dimension of the second main body portion 21 that is the distance between the first surface 21a and the second surface 21b toward a tip end.

The second engagement portion 22 has a substantially letter U shape that opens upward in a transverse section perpendicular to the longitudinal direction of the second fastening member 20 (FIG. 7). The second engagement portion 22 includes a second base end wall portion 22a, which is connected with the second main body portion 21 and which bends at approximately 90 degrees and extends from the second main body portion 21, a second intermediate wall portion 22b, which bends and extends from the second base end wall portion 22a, and a second tip end wall portion 22c, which bends and extends from the second intermediate wall portion 22b.

In this case, the thickness dimensions of the second base end wall portion 22a and the second intermediate wall portion 22b of the second engagement portion 22 are set to be the same with the thickness dimension of the second main body portion 21 or to be slightly smaller than the thickness dimension of the second main body portion 21. The thickness dimension at the second tip end wall portion 22c of the second engagement portion 22 is set to be smaller than the thickness dimensions of the second base end wall portion 22a and the second intermediate wall portion 22b.

In the transverse section of the second fastening member 20 (FIG. 7), the second base end wall portion 22a is disposed in a direction perpendicular to the second main body portion 21. The second intermediate wall portion 22b of the second engagement portion 22 extends from a tip end portion of the second base end wall portion 22a in a direction inclined with respect to the second main body portion 21 so that the angle on the inner peripheral surface side with respect to the second base end wall portion 22a is greater than 90 degrees.

The second tip end wall portion 22c extends from a tip end portion of the second intermediate wall portion 22b in a direction parallel to the second base end wall portion 22a. In addition, the gap between the second base end wall portion 22a and the second tip end wall portion 22c in the second engagement portion 22 is set to be larger than the thickness dimension of the first tip end wall portion 12c so that the first tip end wall portion 12c of the first fastening member 10 can be inserted into the inner space portion 23 of the second engagement portion 22.

In the second fastening member 20 according to the present first embodiment, there are formed the plurality of second slit portions 26, which are formed along a perpendicular direction perpendicular to the longitudinal direction of the second fastening member 20 (an intersecting direction that intersects the longitudinal direction at an angle of 90 degrees), and a second continuous portion 27, which is continuously connected in the longitudinal direction of the second fastening member 20, as a part where no second slit portion 26 is provided. It is to be noted that the second slit portions 26 according to the present first embodiment may be formed along the intersecting direction that intersects the longitudinal direction of the second fastening member 20 at a predetermined angle other than 90 degrees, in a similar manner to the case of the first slit portions 16.

The plurality of second slit portions 26 are provided in a form (location, shape, and size) that the second fastening member 20 can be curved in the right-left direction parallel to the first surface (secured surface) 21a of the second main body portion 21.

To be specific, the plurality of second slit portions 26 in the present first embodiment are formed in parallel with one another at a constant pitch interval P2 in the longitudinal direction of the second fastening member 20. In this case, the formation pitch interval P2 of the second slit portions 26 has a total size of a second slit width dimension W2, which is a dimension of the second slit portion 26 in the longitudinal direction, and a second slit separation interval D2, which is a distance between the second slit portions 26 adjacent to each other in the longitudinal direction.

In addition, the second slit width dimension W2 is set to be smaller than the second slit separation interval D2. In a plan view when the second fastening member 20 is viewed from a direction perpendicular to the secured surface 21a of the second main body portion 21 (refer to FIG. 6), the respective second slit portions 26 are arranged continuously in the above-described perpendicular direction (right-left direction) from an end edge on the side where the second engagement portion 22 is disposed in the right-left direction of the second fastening member 20 to the vicinity of the tip end portion of the second main body portion 21. With such a plurality of second slit portions 26, the second engagement portions 22 are formed along the longitudinal direction in a form of being separated into small pieces.

The second continuous portion 27 of the second fastening member 20 is provided at the tip end portion of the second main body portion 21 that is apart from the second engagement portion 22.

As described above, the plurality of second slit portions 26 and the second continuous portion 27 are provided in the second fastening member 20. Therefore, the second fastening member 20 can be curved easily in the right-left direction parallel to the secured surface 21a of the second main body portion 21, with the second continuous portion 27 as an axis (center), as indicated by a virtual line in FIG. 5 and FIG. 8. Further, the material cost of the second fastening member 20 can be reduced, and the weight of the second fastening member 20 can be reduced.

In the relationship between the first fastening member 10 and the second fastening member 20 in the present first embodiment, the formation pitch interval P1 of the first slit portions 16 provided in the first fastening member 10 and the formation pitch interval P2 of the second slit portions 26 provided in the second fastening member 20 are set to the same size. Further, the first slit width dimension W1 of the first fastening member 10 is set to be smaller than the second slit separation interval D2 of the second fastening member 20, and the second slit width dimension W2 of the second fastening member 20 is set to be smaller than the first slit separation interval D1 of the first fastening member 10.

The first slit portion 16 and the second slit portion 26 are formed in the relationship as described above. Hence, in a case where the second fastening member 20 is held by the first fastening member 10 in the permanent engagement state and the second sheet member 7 is fastened with the first sheet member 6, even when the second fastening member 20 moves in the longitudinal direction with respect to the first fastening member 10, the first engagement portion 12 of the first fastening member 10 is unlikely to enter the second slit portion 26 of the second fastening member 20, and the second engagement portion 22 of the second fastening member 20 is unlikely to enter the first slit portion 16 of the first fastening member 10. Accordingly, the first fastening member 10 and the second fastening member 20 are unlikely to be caught with each other, and the first fastening member 10 and the second fastening member 20 can move appropriately. This can suppress the occurrence of a wrinkle in the first sheet member 6 and the second sheet member 7, and can suppress a state where the first sheet member 6 or the second sheet member 7 is locally pulled and extended, and the like.

It is to be noted that in the present invention, regarding the above-described relationship between the first slit width dimension W1 of the first fastening member 10 and the second slit separation interval D2 of the second fastening member 20 and the above-described relationship between the second slit width dimension W2 of the second fastening member 20 and the first slit separation interval D1 of the first fastening member 10, it is sufficient if the relationship is satisfied in at least a part of the first fastening member 10 and the second fastening member 20.

In the sheet fastener 1 according to the present first embodiment as described above, the first fastening member 10 is secured to the first sheet member 6 by sewing the first main body portion 11 to the sheet edge portion 6a of the first sheet member 6 in a sewing process with the sheet edge portion 6a of the first sheet member 6 overlapping the first surface 11a of the first main body portion 11.

The second fastening member 20 is secured to the second sheet member 7 by sewing the second main body portion 21 to the sheet edge portion 7a of the second sheet member 7 in a sewing process with the sheet edge portion 7a of the second sheet member 7 overlapping the first surface 21a of the second main body portion 21. In this case, the second surface 21b of the second main body portion 21 is not directly secured to the second sheet member 7.

It is to be noted that in the present invention, the means for respectively securing the first fastening member 10 and the second fastening member 20 to the first sheet member 6 and the second sheet member 7 is not particularly limited. For example, any other conventionally known securing means such as adhesion or welding can be used.

Next, a method for fastening the second sheet member 7 with the first sheet member 6 by engaging the second fastening member 20 secured to the second sheet member 7 with the first fastening member 10 secured to the first sheet member 6, as illustrated in FIG. 1, will be described. In this case, the first sheet member 6 and the second sheet member 7 are covered on the surface of the cushion body 5.

Figure 8:
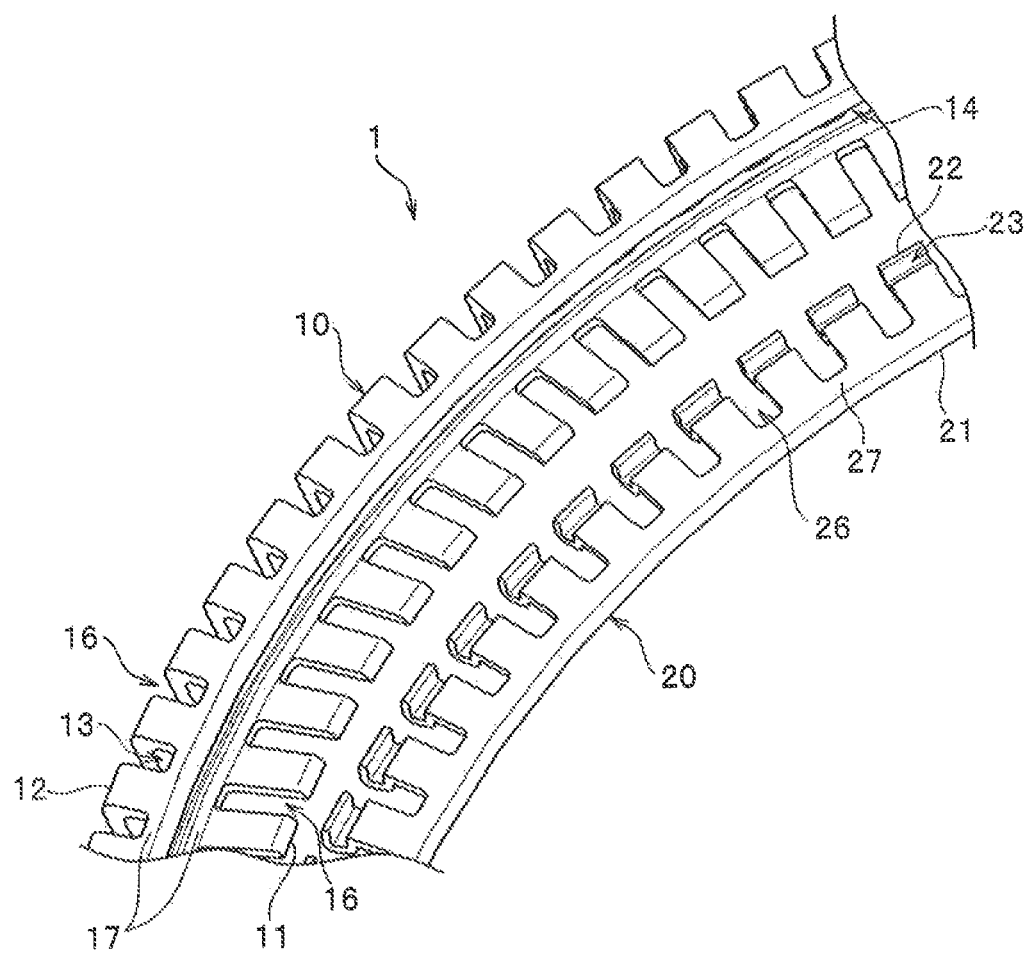
FIG. 8 is a perspective view illustrating a state where the first fastening member of FIG. 2 and the second fastening member of FIG. 5 are respectively curved in directions parallel to the secured surfaces of the first main body portion and the second main body portion.

In addition, the first fastening member 10 is sewn to the sheet edge portion 6a, which is curved, of the first sheet member 6, in a curved state in a direction (right-left direction) parallel to the first surface (secured surface) 11a of the first main body portion 11, as illustrated in FIG. 8, for example. In addition, the second fastening member 20 is also sewn to the sheet edge portion 7a, which is curved, of the second sheet member 7, in a curved state in a direction (right-left direction) parallel to the first surface (secured surface) 21a of the second main body portion 21, as illustrated in FIG. 8.

First, an operator holds the second fastening member 20 in a curved state, and brings the second engagement portion 22 of the second fastening member 20 closer to the first fastening member 10 in a curved state. Further, the operator inserts the second tip end wall portion 22c of the second engagement portion 22 into the accommodation space portion 13 from the opening portion 14 of the first fastening member 10 sequentially along the longitudinal direction of the second fastening member 20. At the same time, the operator inserts the tip end portion of the first tip end wall portion 12c in the first fastening member 10 into the inner space portion 23 of the second engagement portion 22.

In this situation, as described above, the first continuous portions 17 of the first fastening member 10 are provided at the opening adjacent end portions 18 including the tip end portion of the first tip end wall portion 12c adjacent to the opening portion 14 of the first engagement portion 12, and at the opening adjacent end portion 18 including the first protrusion portion 12d. Accordingly, even in the case where the second engagement portion 22 is separated into small pieces by the second slit portions 26, the second tip end wall portion 22c of the second engagement portion 22 can be easily and smoothly inserted into the opening portion 14, which is interposed between the first continuous portions 17 of the first fastening member 10, and can be guided to the accommodation space portion 13.

It is to be noted that in the present first embodiment, in order to facilitate the insertion of the second engagement portion 22 into the opening portion 14 of the first engagement portion 12, the first continuous portions 17 are provided at the opening adjacent end portion 18 including the tip end portion of the first tip end wall portion 12c adjacent to the opening portion 14 of the first engagement portion 12, and at the opening adjacent end portion 18 including the first protrusion portion 12d. However, in the present first embodiment, for example, instead of providing the first continuous portion 17 at the opening adjacent end portion 18 adjacent to the opening portion 14 of the first engagement portion 12, the second continuous portion 27 continuous in the longitudinal direction can be provided at a tip end portion of the second tip end wall portion 22c in the second engagement portion 22, and the first slit portions 16 can be provided in the entirety of the first engagement portion 12, so that the first engagement portion 12 can also be separated into small pieces. This also facilitates the insertion of the second engagement portion 22 into the opening portion 14 of the first engagement portion 12.

Then, by inserting the tip end portion of the first tip end wall portion 12c into the inner space portion 23 of the second engagement portion 22, as illustrated in FIG. 9, the first tip end wall portion 12c of the first fastening member 10 can be made to abut the inner peripheral surface of the second base end wall portion 22a in the second engagement portion 22, and can be made to abut at least one of inner peripheral surfaces of the second intermediate wall portion 22b and the second tip end wall portion 22c (in the present first embodiment, both inner peripheral surfaces of the second intermediate wall portion 22b and the second tip end wall portion 22c).

In this situation, the second fastening member 20 receives tensile strength to be pulled by the second sheet member 7 to be covered on the cushion body 5. Hence, in the sheet fastener 1, the second tip end wall portion 22c of the second fastening member 20 is stably hooked on the first tip end wall portion 12c of the first fastening member 10, and the stress in a direction of pressing the inner peripheral surface of the second base end wall portion 22a of the second fastening member 20 against the first tip end wall portion 12c of the first fastening member 10 is applied. Accordingly, the second fastening member 20 is held by the first fastening member 10 in a temporary engagement state where the second fastening member 20 is temporarily locked at a predetermined angle. In such a temporary engagement state, by adjusting the locations or the like of the first sheet member 6 and the second sheet member 7, the operator is able to remove a wrinkle, slack, or the like occurring on the first sheet member 6 and the second sheet member 7.

Subsequently, the operator presses the second fastening member 20, which is curved and locked in the temporary engagement state, in a direction that the second main body portion 21 approaches the first fastening member 10 as indicated by a first arrow 31 in FIG. 9, and rotates the second fastening member 20. In this situation, while the second fastening member 20 is rolling up the sheet edge portion 7a of the second sheet member 7, subsequently to the second tip end wall portion 22c, the second intermediate wall portion 22b of the second fastening member 20 is inserted into the accommodation space portion 13 from the opening portion 14 of the first fastening member 10. In addition to that, the tip end portion of the first tip end wall portion 12c of the first fastening member 10 comes out of the inner space portion 23 of the second engagement portion 22. Also at the same time, the first tip end wall portion 12c of the first fastening member 10 is elastically deformed to expand the accommodation space portion 13.

Furthermore, the second fastening member 20 rotates continuously, and subsequently to the second intermediate wall portion 22b, the second base end wall portion 22a of the second fastening member 20 is inserted into the accommodation space portion 13 from the opening portion 14 of the first fastening member 10. As a result, the entirety of the second engagement portion 22 can be easily and smoothly inserted and fitted into the accommodation space portion 13 of the first fastening member 10. In this case, at the timing when the entirety of the second engagement portion 22 is inserted into the accommodation space portion 13 of the first fastening member 10, the first tip end wall portion 12c of the first fastening member 10, which has been elastically deformed, is elastically restored. Accordingly, as illustrated in FIG. 10, the tip end portion of the first tip end wall portion 12c can be made to abut the second surface 21b of the second main body portion 21 of the second fastening member 20 and one surface of the second base end wall portion 22a, which is formed continuously with the second surface 21b.

Further, the first tip end wall portion 12c of the first fastening member 10 is elastically restored as described above. Then, the first fastening member 10 and the second fastening member 20 partially collide with each other, and such a collision can generate a small collision sound or a feel of touch. Accordingly, as illustrated in FIG. 10, even in a case where the first fastening member 10 and the second fastening member 20 are respectively covered with the first sheet member 6 and the second sheet member 7 and cannot be seen from the outside (upper side in the drawing), the operator is able to confirm that the entirety of the second engagement portion 22 has been inserted into the accommodation space portion 13 of the first fastening member 10 by sensing the small collision sound or the feel of touch.

Then, as described above, the entirety of the second engagement portion 22 is inserted and held in the accommodation space portion 13 of the first fastening member 10. Thus, as illustrated in FIGS. 1 and 10, the second main body portion 21 and the second base end wall portion 22a of the second fastening member 20 can be made to abut the tip end portion of the first tip end wall portion 12c in the first fastening member 10. In addition to that, a connection part (or its vicinity) of the second intermediate wall portion 22b and the second tip end wall portion 22c in the second fastening member 20 can be made to abut a connection part (or its vicinity) of the first intermediate wall portion 12b and the first base end wall portion 12a in the first fastening member 10.

In this manner, since the second fastening member 20 abuts the first fastening member 10 at two locations, the second fastening member 20 can be stably engaged (fitted) with the first fastening member 10 in the permanent engagement state with an appropriate engagement force. Accordingly, the first fastening member 10 secured to the first sheet member 6 in the curved state is connected with the second fastening member 20 secured to the second sheet member 7 in the curved state. Therefore, as illustrated in FIG. 1, the sheet edge portion 7a, which is curved, of the second sheet member 7 can be continuously fastened with the sheet edge portion 6a, which is curved, of the first sheet member 6 along the longitudinal directions of the first fastening member 10 and the second fastening member 20.

Furthermore, in the case where the second fastening member 20 is engaged in the permanent engagement state as described above, the first fastening member 10 and the second fastening member 20, which are engaged with each other, receive tensile strength to be respectively pulled from the first sheet member 6 and the second sheet member 7. Accordingly, the stress in a direction of rotating the second fastening member 20 to separate the second main body portion 21 of the second fastening member 20 from the first fastening member 10 is applied to the sheet fastener 1, as indicated by a second arrow 32 in FIG. 10.

In this case, since the second fastening member 20 abuts the first fastening member 10 at the above-described two locations, the first fastening member 10 is capable of supporting the second fastening member 20, by receiving the force in the direction of rotating the second fastening member 20 at these abutment locations. Accordingly, the second fastening member 20 can be prevented from being released from the first fastening member 10 effectively, and the permanent engagement state can be maintained stably.

As described heretofore, in the sheet fastener 1 according to the present first embodiment, the plurality of first slit portions 16 are formed in the first fastening member 10, and the plurality of second slit portions 26 are formed in the second fastening member 20. Therefore, for example, as illustrated in FIG. 1, even in a case where each of the sheet edge portions 6a and 7a of the first sheet member 6 and the second sheet member 7 is formed to be curved with similar curvatures in the directions parallel to the respective sheet edge portions 6a and 7a, the first fastening member 10 and the second fastening member 20 can be curved correspondingly while keeping long-sized states, and can be stably secured to the respective sheet edge portions 6a and 7a.

Furthermore, by engaging the first fastening member 10 and the second fastening member 20, which are respectively secured in the curved states to the first sheet member 6 and the second sheet member 7 with each other in the permanent engagement state, the sheet edge portion 7a, which is curved, of the second sheet member 7 can be easily and smoothly fastened with the sheet edge portion 6a, which is curved, of the first sheet member 6, by a simple operation as described above in a short period of time. Further, in the case of the sheet fastener 1 according to the present first embodiment, neither the first fastening member 10 nor the second fastening member 20 is cut into small pieces as in the conventional case. Therefore, for example, an uneven pattern caused by the small pieces of the first fastening member and the second fastening member is not generated. Therefore, degradation in the external appearance quality of a product resulting from the above-described uneven pattern can be prevented.

Further, in the sheet fastener 1 according to the present first embodiment, when the sheet edge portion 7a of the second sheet member 7 is fastened with the sheet edge portion 6a of the first sheet member 6, the second sheet member 7 is folded back in contact with the tip end portion of the second main body portion 21 of the second fastening member 20, as illustrated in FIG. 10. In this case, the second continuous portion 27 continuous in the longitudinal direction is provided at the tip end portion of the second main body portion 21 of the second fastening member 20. Therefore, in the second fastening member 20 according to the present first embodiment, the second sheet member 7 can be beautifully folded back along the second continuous portion 27, as compared with, for example, the second fastening member in a variation in which the plurality of second slit portions 26 are arranged at the tip end portion of the second main body portion 21.

In addition, for example, in the case where the plurality of second slit portions 26 are arranged at the tip end portion of the second main body portion 21, when the second sheet member 7 is folded back at the tip end portion of the second main body portion 21, it is conceivable that an uneven pattern of the second main body portion 21, which is separated into small pieces by the plurality of second slit portions 26, may appear on the outer surface of the folded-back part of the second sheet member 7. However, since the second continuous portion 27 is provided at the tip end portion of the second main body portion 21 as in the present first embodiment, the drawback of the uneven pattern as described above can be avoided, the folded-back part of the second sheet member 7 can be finished in a smooth form, and the degradation in the appearance quality of the product can be effectively prevented.

Second Embodiment

Figure 11:
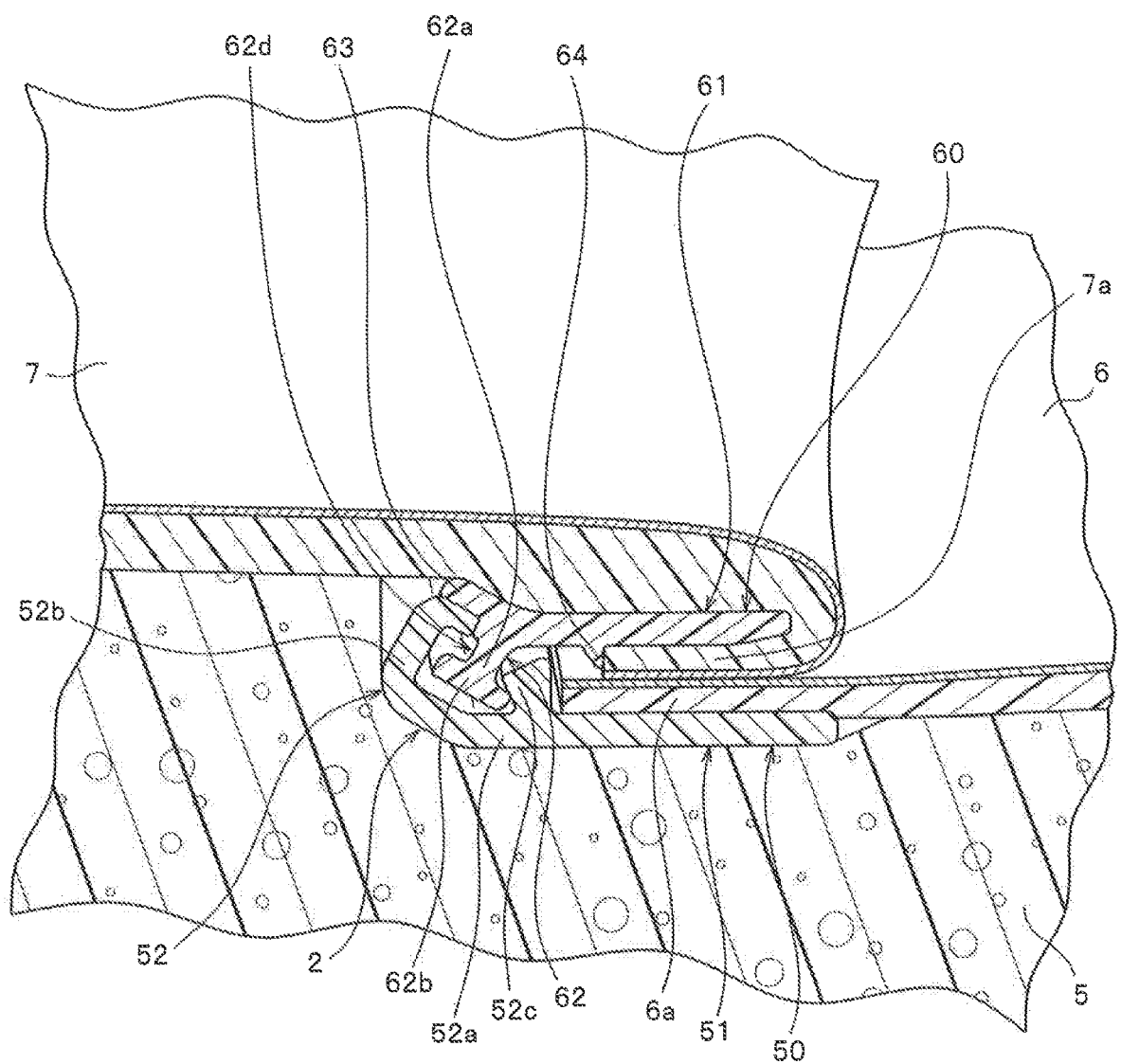
FIG. 11 is a schematic diagram schematically illustrating a state where sheet members are fastened by using a sheet fastener according to a second embodiment of the present invention.
Figure 12:
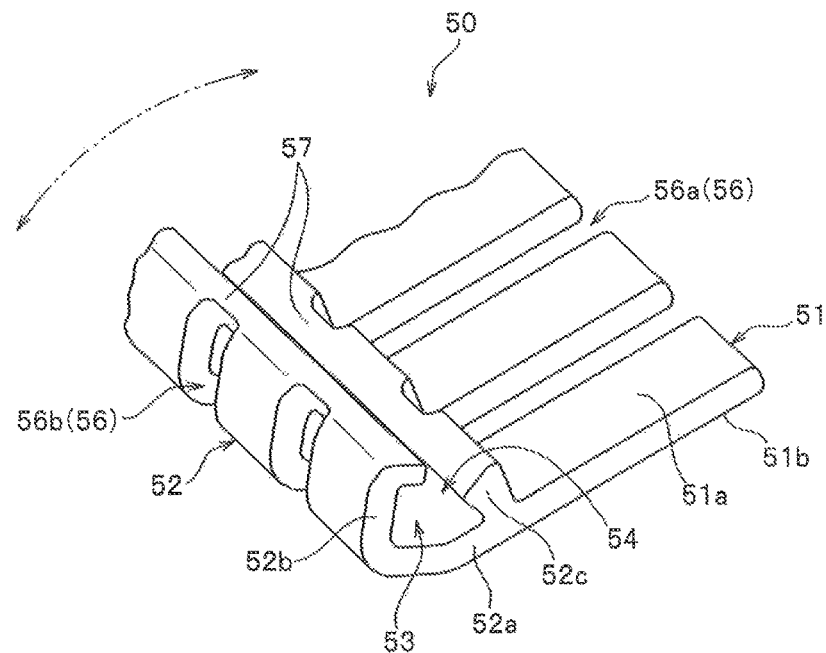
FIG. 12 is a perspective view illustrating a first fastening member of the sheet fastener according to the second embodiment.
Figure 13:
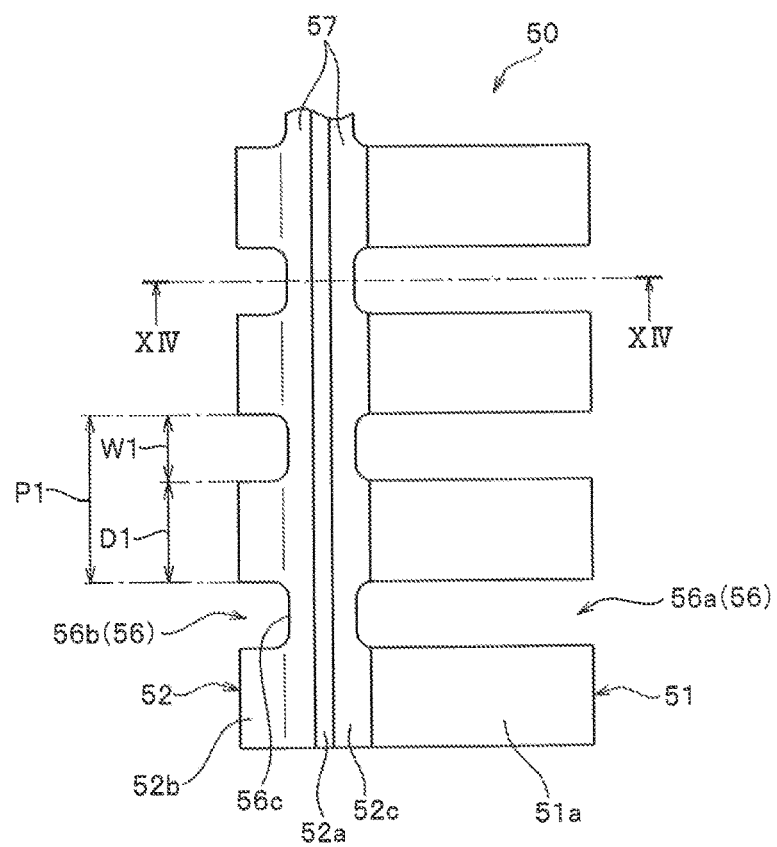
FIG. 13 is a plan view of the first fastening member of FIG. 12, when viewed from a direction perpendicular to a secured surface of the first main body portion.
Figure 14:
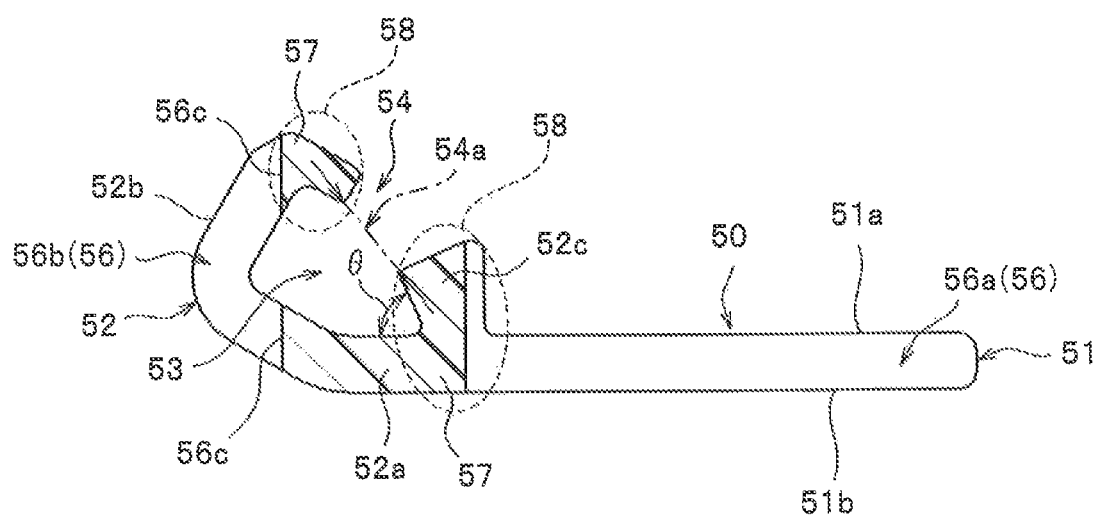
FIG. 14 is a cross-sectional view illustrating a transverse section taken along line XIV-XIV illustrated in FIG. 13.
Figure 15:
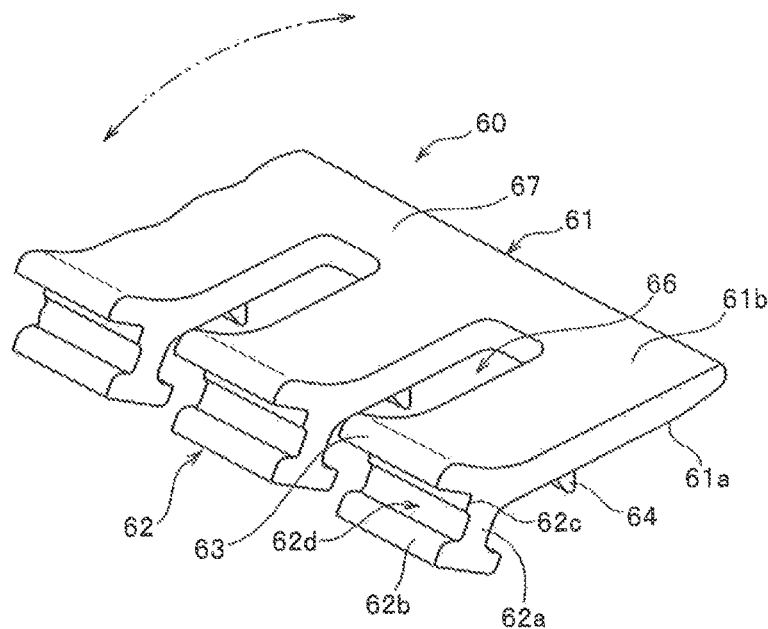
FIG. 15 is a perspective view illustrating a second fastening member of the sheet fastener according to the second embodiment.
Figure 16:
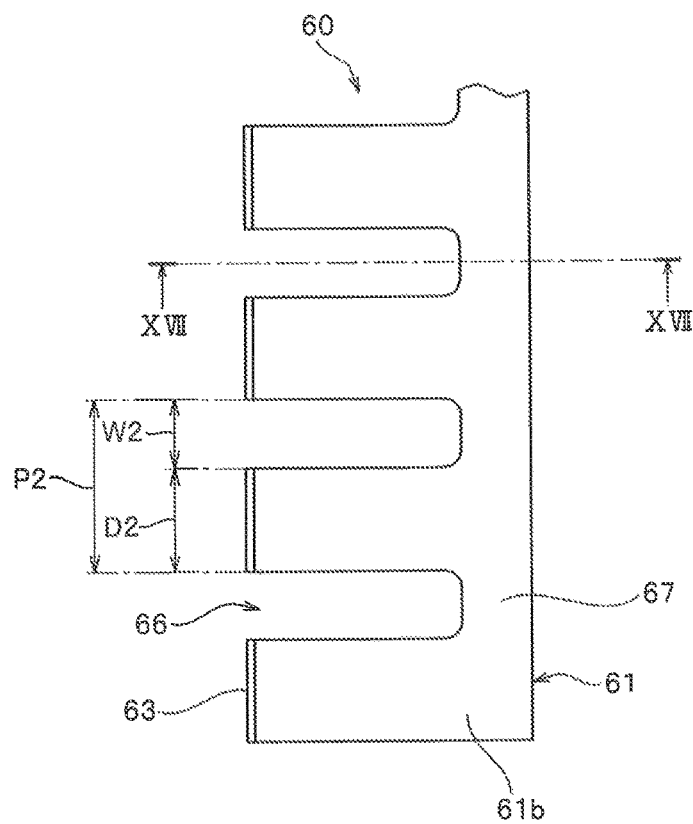
FIG. 16 is a plan view of the second fastening member of FIG. 15, when viewed from a direction perpendicular to a secured surface of the second main body portion.
Figure 17:
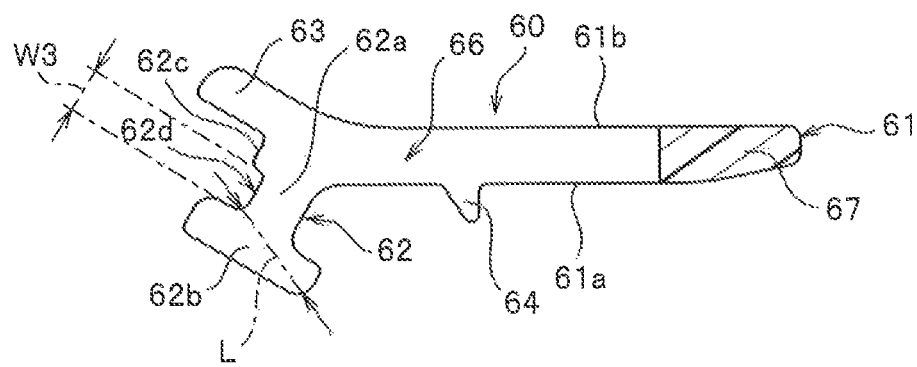
FIG. 17 is a cross-sectional view illustrating a transverse section taken along line XVII-XVII illustrated in FIG. 16.

FIG. 11 is a schematic diagram schematically illustrating a state where sheet members are fastened by using a sheet fastener according to a present second embodiment. FIGS. 12 to 14 are a perspective view, a plan view, and a cross-sectional view schematically illustrating a first fastening member of the sheet fastener. FIGS. 15 to 17 are a perspective view, a plan view, and a cross-sectional view schematically illustrating a second fastening member of the sheet fastener.

A sheet fastener 2 according to the present second embodiment is preferably used for seats for vehicles, aircrafts, ship, and the like, in the same manner as the sheet fastener 1 according to the above-described first embodiment. The sheet fastener 2 is used for continuously fastening a sheet edge portion 7a of a second sheet member 7 with a sheet edge portion 6a of a first sheet member 6 in a boundary part between the first sheet member 6 and the second sheet member 7.

The sheet fastener 2 according to the present second embodiment includes a first fastening member 50, which is long and narrow, to be secured to the sheet edge portion 6a of the first sheet member 6 by sewing or the like, and a second fastening member 60, which is long and narrow, to be secured to the sheet edge portion 7a of the second sheet member 7 by sewing or the like, and to be engaged with the first fastening member 50.

In addition, the first fastening member 50 and the second fastening member 60 according to the present second embodiment are produced by performing extrusion molding, injection molding, or the like to form a long-sized primary molded body, and then, by performing a cutting process on the obtained primary molded body for forming first slit portions 56 and second slit portions 66. The first fastening member 50 and the second fastening member 60 produced in this manner have elasticity.

The first fastening member 50 according to the present second embodiment includes a first main body portion 51, which is secured to the sheet edge portion 6a of the first sheet member 6, a first engagement portion 52, which is integrally provided at a one end portion of the first main body portion 51, an accommodation space portion 53, which is arranged inside the first engagement portion 52 and which accommodates a part of the second fastening member 60, and an opening portion 54, which opens at a part of the first engagement portion 52, and which communicates with the accommodation space portion 53.

The first main body portion 51 of the first fastening member 50 is formed to have a flat plate shape that is long and narrow in the longitudinal direction. The first main body portion 51 includes a first surface 51a, which has a plane shape and which serves as a secured surface to be secured in contact with the first sheet member 6, and a second surface 51b, which has a plane shape and which is disposed on the opposite side of the first surface 51a. Further, the thickness dimension of the first main body portion 51 (dimension between the first surface 51a and the second surface 51b of the first main body portion 51) is set to a constant size except for a tip end portion in the first main body portion 51 that is farthest from the first engagement portion 52.

The first engagement portion 52 opens obliquely upward and has a substantially letter C shape in a transverse section perpendicular to the longitudinal direction of the first fastening member 50 (FIG. 14). The first engagement portion 52 includes a first base end wall portion 52a, which is formed continuously from the first main body portion 51, and a first extension portion 52b, which extends bending from a tip end portion of the first base end wall portion 52a, and a first protrusion portion 52c, which protrudes upward from the first surface of the first base end wall portion 52a. In this case, the boundary between the first main body portion 51 and the first engagement portion 52 lies on an extension line of an outer wall surface of the first protrusion portion 52c facing the first main body portion 51 side. Further, the first surface and the second surface of the first base end wall portion 52a refer to surfaces respectively facing the same directions with the directions that the first surface 51a and the second surface 51b of the first main body portion 51 face.

The first base end wall portion 52a of the first engagement portion 52 is arranged in parallel with the first main body portion 51, and is formed to have the same thickness dimension with the first main body portion 51. The first extension portion 52b extends from the tip end portion of the first base end wall portion 52a and bends to be folded back on the first surface side of the first base end wall portion 52a, when the transverse section of the first fastening member 50 is viewed. In this case, a part of the first extension portion 52b that starts bending with respect to the first base end wall portion 52a is the boundary between the first base end wall portion 52a and the first extension portion 52b. Moreover, the first extension portion 52b is formed to have the same thickness with the first base end wall portion 52a except for a tip end portion of the first extension portion 52b. On the other hand, the tip end portion of the first extension portion 52b is formed to be thinner than the first base end wall portion 52a.

The first protrusion portion 52c protrudes on the first surface of the first base end wall portion 52a, and protrudes from the first surface toward the tip end portion of the first extension portion 52b. As illustrated in FIG. 14, the first protrusion portion 52c includes an outer wall surface disposed on the first main body portion 51 side, an inner wall surface disposed on the accommodation space portion 53 side, and a top end surface that is apart from the first surface of the first base end wall portion 52a and that is arranged between an upper end part of the outer wall surface and an upper end part of the inner wall surface.

In this case, the outer wall surface of the first protrusion portion 52c is perpendicular to the first surface of the first base end wall portion 52a. As illustrated in FIG. 14, an inner wall surface of the first protrusion portion 52c is disposed such that an angle θ between the inner wall surface and the first surface of the first base end wall portion 52a is less than 90 degrees. Particularly in the case of the present embodiment, the angle θ between the inner wall surface of the first protrusion portion 52c and the first surface of the first base end wall portion 52a is set to 40 degrees or more and 70 degrees or less. It is to be noted that in the present invention, the inner wall surface of the first protrusion portion 52c may be formed so that the angle with respect to the first surface of the first base end wall portion 52a is 90 degrees, or more than 90 degrees.

The accommodation space portion 53 of the first engagement portion 52 is formed to be surrounded by the first base end wall portion 52a, the first extension portion 52b, and the first protrusion portion 52c. The accommodation space portion 53 is formed along the longitudinal direction of the first fastening member 50, and is provided to correspond to the size of a second engagement portion 62 (in particular, an engagement head portion 62b) of the second fastening member 60. It is to be noted that in the first fastening member 50 according to the present invention, the accommodation space portion 53 of the first engagement portion 52 can be formed to be surrounded by only the first extension portion 52b and the first protrusion portion 52c, by changing the formation location, the protrusion direction, or the like of the first protrusion portion 52c.

The opening portion 54, which communicates with the accommodation space portion 53, is provided between the tip end portion of the first extension portion 52b and the first protrusion portion 52c. As illustrated in FIG. 14, in a case where a size 54a of the opening portion 54 is defined as the shortest distance between the tip end portion of the first extension portion 52b and the first protrusion portion 52c, the size 54a of the opening portion 54 is set to be slightly smaller than a minimum length L from an insertion groove portion 62d, which is disposed in the second engagement portion 62 of the second fastening member 60, to an end portion of the engagement head portion 62b on a second main body portion 61 side (refer to FIG. 17).

In addition, the opening portion 54 is formed such that a virtual straight line connecting the shortest distance between the tip end portion of the first extension portion 52b and the first protrusion portion 52c is arranged at an inclined angle of less than 90 degrees with respect to the first surface 51a of the first main body portion 51 and the first surface of the first base end wall portion 52a, preferably at an inclined angle of 70 degrees or less. By arranging the opening portion 54 to be inclined with respect to the first surface 51a of the first main body portion 51 and the first surface of the first base end wall portion 52a in such a manner, an extension length of the first extension portion 52b that extends bending from the first base end wall portion 52a can be shorter. As a result, the first extension portion 52b can be formed to have a relatively small size and a small transverse sectional area.

In the present second embodiment, since first continuous portions 57, to be described later, are formed at the tip end portion of the first extension portion 52b and the first protrusion portion 52c in the first engagement portion 52, the opening portion 54 is continuously arranged along the longitudinal direction of the first fastening member 50 to be interposed between the two first continuous portions 57.

In the first fastening member 50 according to the present second embodiment, in the same manner as the first fastening member 10 in the above-described first embodiment, there are formed the plurality of first slit portions 56, which are formed along the perpendicular direction perpendicular to the longitudinal direction of the first fastening member 50, and the first continuous portions 57, which are continuous in the longitudinal direction of the first fastening member 50, as parts where no first slit portion 56 is provided. It is to be noted that the first slit portions 56 according to the present second embodiment may be formed along an intersecting direction that intersects the longitudinal direction of the first fastening member 50 at a predetermined angle other than 90 degrees.

The plurality of first slit portions 56 are formed in parallel with one another at the constant pitch interval P1 in the longitudinal direction of the first fastening member 50. In this case, the formation pitch interval P1 of the first slit portions 56 has the total size of the first slit width dimension W1 in the longitudinal direction and a first slit separation interval D1 in the longitudinal direction. In addition, the first slit width dimension W1 is set to be smaller than the first slit separation interval D1.

The first slit portion 56 of the first fastening member 50 includes a main body side first slit portion 56a provided in the first main body portion 51, and an engagement side first slit portion 56b provided in the first engagement portion 52, in a plan view when the first fastening member 50 is viewed from a direction perpendicular to the first surface (secured surface) 51a of the first main body portion 51 (refer to FIG. 13). In particular, the first slit portions 56 each include a pair of the main body side first slit portion 56a and the engagement side first slit portion 56b. The pair of the main body side first slit portion 56a and the engagement side first slit portion 56b are formed to correspond to each other at the same locations in the longitudinal direction of the first fastening member 50.

The main body side first slit portion 56a is disposed linearly from a tip end edge of the first main body portion 51 to a part partially including a part of the first engagement portion 52 (a part of the first base end wall portion 52a and a part of the first protrusion portion 52c). That is, in a plan view of the first fastening member 50, the main body side first slit portion 56a is formed such that the dimension in the perpendicular direction (right-left direction perpendicular to the longitudinal direction) of the first fastening member 50 is larger than the dimension in the perpendicular direction of the first main body portion 51. Further, in this case, the dimension of the main body side first slit portion 56a in the above-described perpendicular direction is preferably formed to occupy a range of 50% or more of the dimension from the tip end edge of the first main body portion 51 with respect to the dimension in the above-described perpendicular direction of the entirety of the first fastening member 50.

The engagement side first slit portion 56b is continuously arranged at a part of the first extension portion 52b in the first engagement portion 52. The engagement side first slit portion 56b is disposed, in a plan view of the first fastening member 50, from an end edge on the side where the first engagement portion 52 in the right-left direction of the first fastening member 50 is disposed, to the vicinity of the tip end portion of the first extension portion 52b of the first engagement portion 52.

When the transverse section of the first fastening member 50 is viewed (FIG. 14), an upper slit end face 56c and a lower slit end face 56c, which are formed on the first extension portion 52b, are provided as end portions in the above-described perpendicular direction (right-left direction) in the engagement side first slit portion 56b. In this case, the upper slit end face 56c and the lower slit end face 56c are disposed at locations that overlap each other in the plan view of the first fastening member 50 (FIG. 13). Accordingly, the first fastening member 50 can be curved more easily in a direction parallel to the first surface 51*a* of the first main body portion 51, as will be described later.

As illustrated in FIG. 14, for example, the first continuous portions 57 of the first fastening member 50 are formed at opening adjacent end portions 58, which are adjacent to the opening portion 54 so as to interpose the opening portion 54 of the first engagement portion 52. That is, the first continuous portions 57 according to the present second embodiment are provided to be separated into the opening adjacent end portion 58 formed with the tip end portion of the first extension portion 52*b*, and the opening adjacent end portion 58 including a part of the first protrusion portion 52*c* and a part of the first base end wall portion 52*a*, as an upper part and a lower part in the first engagement portion 52, each having a transverse sectional area that ensures appropriate strength.

Figure 18:
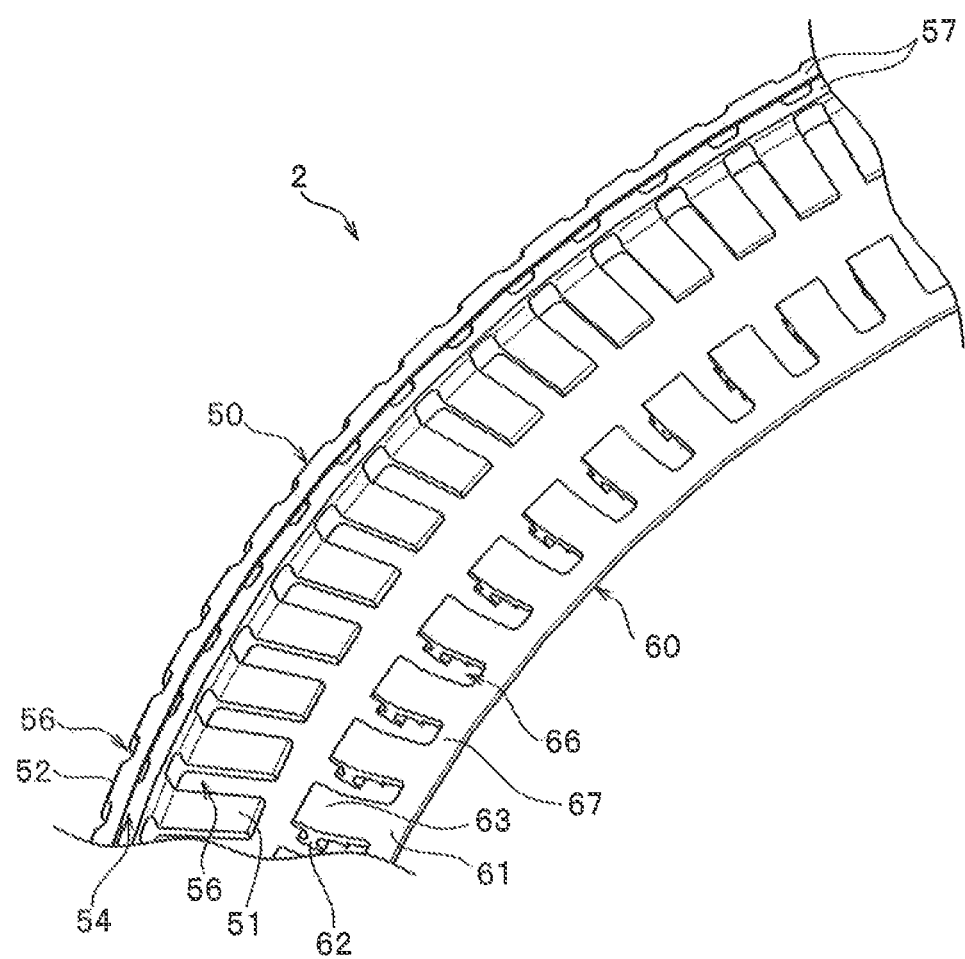
FIG. 18 is a perspective view illustrating a state where the first fastening member of FIG. 12 and the second fastening member of FIG. 15 are respectively curved in directions parallel to the secured surfaces of the first main body portion and the second main body portion.

As described above, the plurality of first slit portions 56 and the first continuous portions 57 are provided in the first fastening member 50 in the present second embodiment. Therefore, the first fastening member 50 can be curved easily in the right-left direction parallel to the first surface (secured surface) 51*a* of the first main body portion 51, with the two first continuous portions 57 disposed in a separated manner in the upper-lower direction as an axis (center), as indicated by a virtual line in FIG. 12 and FIG. 18. Further, the material cost of the first fastening member 50 can be reduced, and the weight of the first fastening member 50 can be reduced.

The second fastening member 60 according to the present second embodiment includes the second main body portion 61 to be secured to the sheet edge portion 7*a* of the second sheet member 7, the second engagement portion 62, which bends and extends from a one end portion of the second main body portion 61, and a protrusion piece portion 63, which protrudes from the second engagement portion 62.

The second main body portion 61 is formed to have a plate shape that is long and narrow in the longitudinal direction. The second main body portion 61 includes a first surface (secured surface) 61*a*, which serves as a secured surface to be secured in contact with the first sheet member 6, and which faces the first fastening member 50 when the second fastening member 60 is held by the first fastening member 50 in the permanent engagement state, and a second surface 61*b*, which has a plane shape and which is disposed on the opposite side of the first surface 61*a*. In this case, the first surface 61*a* of the second main body portion 61 serves as an inner surface disposed to face the cushion body 5, and the second surface 61*b* of the second main body portion 61 serves as an outer surface facing the outer side with respect to the cushion body 5.

Further, the tip end portion of the first surface 61*a* in the second main body portion 61 (end portion on the side opposite to the side connected with the second engagement portion 62) is formed to have an inclined surface or a curved surface that gradually decreases the thickness dimension of the second main body portion 61 toward a tip end. Furthermore, a positioning protrusion portion 64 for positioning the second fastening member 60 with respect to the sheet edge portion 7*a* of the second sheet member 7 is provided on the first surface 61*a* of the second main body portion 61. It is to be noted that in the present invention, the second fastening member can be formed without the provision of the positioning protrusion portion 64.

The second engagement portion 62 of the second fastening member 60 is formed to bend on the first surface 61*a* side of the second main body portion 61 with respect to the second main body portion 61, and has a substantially letter T shape in a transverse section perpendicular to the longitudinal direction. The second engagement portion 62 includes a neck portion 62*a*, which extends in a direction inclined with respect to the second main body portion 61, the engagement head portion 62*b*, which is disposed at a tip end portion of the neck portion 62*a*, an abutment portion 62*c*, which is disposed at a base end portion of the neck portion 62*a*, and an insertion groove portion 62*d*, which is recessed between the abutment portion 62*c* and the engagement head portion 62*b*. In this case, when the transverse section of the second fastening member 60 is viewed (refer to FIG. 17), the boundary between the second main body portion 61 and the second engagement portion 62 lies on a virtual straight line or its vicinity part, the virtual straight line being obtained by extending the plane portion of the surface of the neck portion 62*a* facing the second main body portion 61 side toward the side opposite to the engagement head portion 62*b* side.

The neck portion 62*a* of the second engagement portion 62 is connected with the second main body portion 61, and is disposed extending to be inclined at a predetermined angle with respect to the second main body portion 61. The engagement head portion 62*b* extends linearly from the tip end portion of the neck portion 62*a* in a direction that intersects the neck portion 62*a* (in particular, a perpendicular direction) so as to have a substantially letter T shape in a transverse section together with the neck portion 62*a*.

In this case, the engagement head portion 62*b* includes a first head portion that extends on the second main body portion 61 side with respect to the neck portion 62*a*, and a second head portion that extends on the opposite side of the first head portion. In addition, in the present embodiment, the first head portion and the second head portion of the engagement head portion 62*b* extend to have substantially the same length with each other with reference to the center position of the neck portion 62*a*.

The abutment portion 62*c* of the second engagement portion 62 is a part to be abutted by a tip end portion (in particular, a tip end face) of the first extension portion 52*b* of the first fastening member 50, when the second fastening member 60 is held by the first fastening member 50 in the permanent engagement state. The abutment portion 62*c* is disposed to be adjacent to the protrusion piece portion 63.

The insertion groove portion 62*d* of the second engagement portion 62 is provided along a longitudinal direction of the second fastening member 60 between the abutment portion 62*c* and the second head portion of the engagement head portion 62*b*. The insertion groove portion 62*d* includes a groove bottom portion that serves as a bottom surface of the insertion groove portion 62*d*, and a pair of groove side wall portions. In addition, a groove width dimension W3 of the insertion groove portion 62*d* that is a gap between the pair of groove side wall portions is set to a size that enables the insertion of the first extension portion 52*b* of the first fastening member 50, that is slightly larger than the thickness of the tip end portion of the first extension portion 52*b*. In particular, the insertion groove portion 62*d* is preferably formed to have a size that allows the first extension portion 52*b* to move slightly in the insertion groove portion 62*d*, and at the same time, that prevents the first extension portion 52*b* from rattling in the insertion groove portion 62*d*.

The protrusion piece portion 63 of the second fastening member 60 protrudes from the second engagement portion 62 in a direction perpendicular to the neck portion 62*a*. It is to be noted that in the present invention, the protrusion piece portion 63 may be formed so as to protrude from the second main body portion 61 according to the size and shape of the second fastening member, instead of protruding from the second engagement portion 62. Further, the second fastening member can be formed without the provision of the protrusion piece portion 63.

In the second fastening member 60 according to the present second embodiment, there are formed the plurality of second slit portions 66, which are formed along an perpendicular direction perpendicular to the longitudinal direction of the second fastening member 60 (an intersecting direction that intersects the longitudinal direction at an angle of 90 degrees), and a second continuous portion 67, which is continuous in the longitudinal direction of the second fastening member 60 as a part where no second slit portion 66 is provided. It is to be noted that the second slit portions 66 according to the present second embodiment may be formed along an intersecting direction that intersects the longitudinal direction of the second fastening member 60 at a predetermined angle.

The plurality of second slit portions 66 are formed in parallel with one another at the constant pitch interval P2 in the longitudinal direction of the second fastening member 60. In this case, the formation pitch interval P2 of the second slit portions 66 has the total size of the second slit width dimension W2 in the longitudinal direction and the second slit separation interval D2 in the longitudinal direction, in the same manner as the above-described first embodiment. In addition, the second slit width dimension W2 is set to be smaller than the second slit separation interval D2.

In a plan view when the second fastening member 60 is viewed from a direction perpendicular to the secured surface 61*a* of the second main body portion 61 (refer to FIG. 16), the respective second slit portions 66 are arranged continuously in the perpendicular direction from an end edge on the side where the second engagement portion 62 is disposed in the right-left direction of the second fastening member 60 to the vicinity of the tip end portion of the second main body portion 61. With the provision of such a plurality of second slit portions 66, the second engagement portions 62 are formed along the longitudinal direction in a form of being separated into small pieces.

The second continuous portion 67 of the second fastening member 60 is provided at the tip end portion of the second main body portion 61 that is apart from the second engagement portion 62.

As described above, the plurality of second slit portions 66 and the second continuous portion 67 are provided in the second fastening member 60. Therefore, the second fastening member 60 can be curved easily in the right-left direction parallel to the secured surface 61*a* of the second main body portion 61, with the second continuous portion 67 as an axis (center), as indicated by a virtual line in FIG. 15 and FIG. 18. Further, the material cost of the second fastening member 60 can be reduced, and the weight of the second fastening member 60 can be reduced.

Furthermore, also in the relationship between the first fastening member 50 and the second fastening member 60 in the present second embodiment, the formation pitch interval P1 of the first slit portions 56 provided in the first fastening member 50 and the formation pitch interval P2 of the second slit portions 66 provided in the second fastening member 60 are set to the same size. Further, the first slit width dimension W1 of the first fastening member 50 is set to be smaller than the second slit separation interval D2 of the second fastening member 60, and the second slit width dimension W2 of the second fastening member 60 is set to be smaller than the first slit separation interval D1 of the first fastening member 50.

Accordingly, also in the sheet fastener 2 according to the present second embodiment, in the same manner as the case of the above-described first embodiment, the first fastening member 50 and the second fastening member 60 become unlikely to be caught with each other. This enables the first fastening member 50 and the second fastening member 60 to move individually appropriately. This configuration can suppress the occurrence of a wrinkle in the first sheet member 6 and the second sheet member 7, and can suppress that the first sheet member 6 or the second sheet member 7 is locally pulled to become an extended state.

Next, a method for fastening the second sheet member 7 with the first sheet member 6 by engaging the second fastening member 60 secured to the second sheet member 7 with the first fastening member 50 secured to the first sheet member 6, as illustrated in FIG. 11, will be described. In this case, the first sheet member 6 and the second sheet member 7 are covered on the surface of the cushion body 5.

In addition, the first fastening member 50 is sewn to the sheet edge portion 6*a*, which is curved, of the first sheet member 6, in a curved state in a direction (right-left direction) parallel to the first surface (secured surface) 51*a* of the first main body portion 51. The second fastening member 60 is sewn to the sheet edge portion 7*a*, which is curved, of the second sheet member 7, in a curved state in a direction (right-left direction) parallel to the first surface (secured surface) 61*a* of the second main body portion 61.

Figure 19:
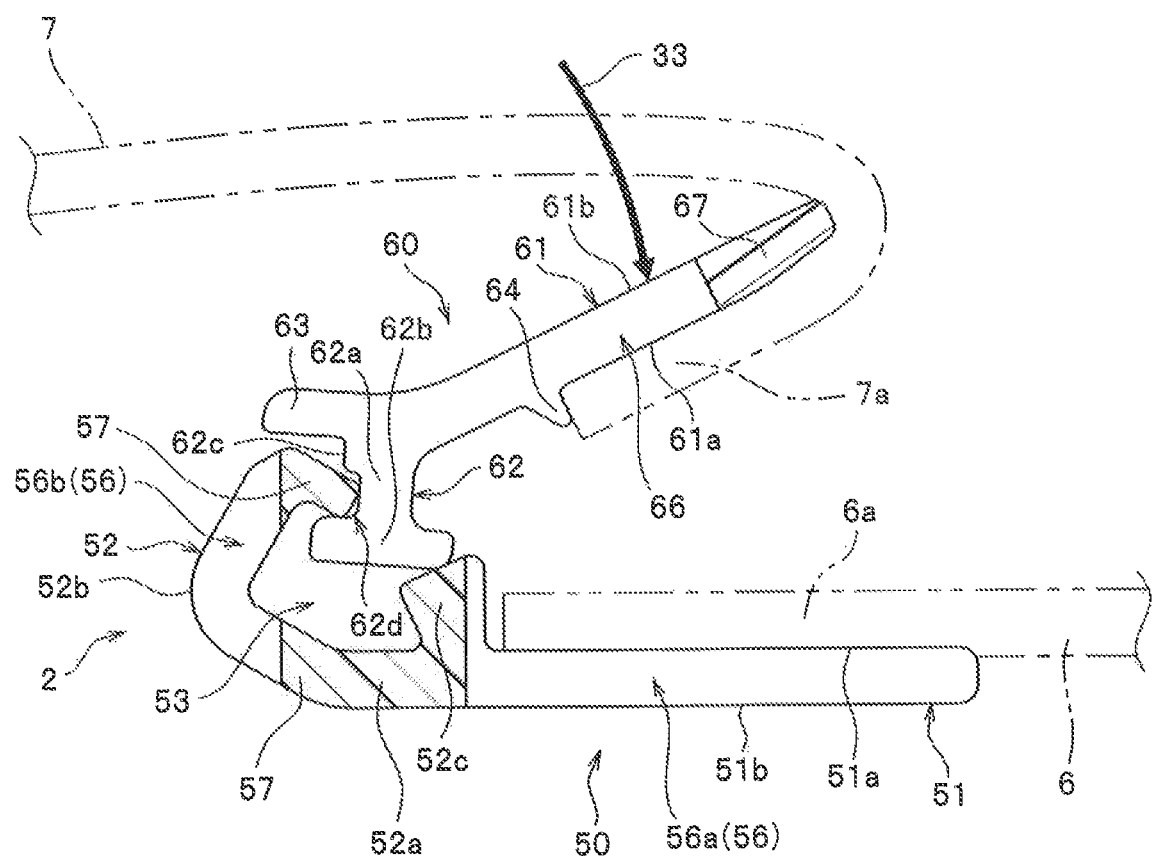
FIG. 19 is a cross-sectional view schematically illustrating a temporary engagement state of the sheet fastener according to the second embodiment.

First, an operator holds the second fastening member 60, which is secured in a curved shape, and brings the second engagement portion 62 of the second fastening member 60 closer to the first fastening member 50 in a curved state. Furthermore, the operator inserts a part (the second head portion) of the engagement head portion 62*b* of the second engagement portion 62 into the accommodation space portion 53 from the opening portion 54 of the first fastening member 50, as illustrated in FIG. 19, and inserts the tip end portion of the first extension portion 52*b* of the first engagement portion 52 into the insertion groove portion 62*d* of the second engagement portion 62. At the same time, the operator causes the engagement head portion 62*b* of the second engagement portion 62 to abut a top end surface of the first protrusion portion 52*c* of the first fastening member 50.

In this situation, as described above, the first continuous portions 57 of the first fastening member 50 are provided at the tip end portion of the first extension portion 52*b*, which is adjacent to the opening portion 54 of the first engagement portion 52, and at a part of the first protrusion portion 52*c*. Accordingly, even in the case where the second engagement portion 62 is separated into small pieces by the formation of the second slit portions 66, the engagement head portion 62*b* of the second engagement portion 62 can be easily and smoothly inserted into the opening portion 54, which is interposed between the first continuous portions 57 of the first fastening member 50, and can be guided to the accommodation space portion 53.

It is to be noted that in the present second embodiment, in order to facilitate the insertion of the second engagement portion 62 into the opening portion 54 of the first engagement portion 52, the first continuous portions 57 are provided at the tip end portion of the first extension portion 52*b* adjacent to the opening portion 54 of the first engagement portion 52, and at a part of the first protrusion portion 52*c*. However, in the present second embodiment, for example, instead of providing the first continuous portion 57 at the opening adjacent end portion 58 adjacent to the opening portion 54 of the first engagement portion 52, the second continuous portion 67 continuous in the longitudinal direction can be provided at the engagement head portion 62b of the second engagement portion 62 and at a part of the neck portion 62a, and the first slit portions 56 can be provided in the entirety of the first engagement portion 52, so that the entirety of the first engagement portion 52 can also be separated into small pieces. This also facilitates the insertion of the second engagement portion 62 into the opening portion 54 of the first engagement portion 52.

Then, by causing the second engagement portion 62 of the second fastening member 60 to abut the first extension portion 52b and the first protrusion portion 52c of the first fastening member 50 simultaneously by the above-described operation, the second fastening member 60 is held by the first fastening member 50 in the temporary engagement state where the first extension portion 52b of the first fastening member 50 is temporarily locked while being inserted into the insertion groove portion 62d of the second engagement portion 62. In such a temporary engagement state, by adjusting the locations or the like of the first sheet member 6 and the second sheet member 7, the operator is able to remove a wrinkle, slack, or the like occurring on the first sheet member 6 and the second sheet member 7.

Subsequently, the operator presses the second fastening member 60, which is curved and locked in the temporary engagement state, so that the second main body portion 61 approaches the first fastening member 50 as indicated by a third arrow 33 in FIG. 19, and rotates the second fastening member 60. In this situation, the second fastening member 60 rotates around a part, as a fulcrum, where the engagement head portion 62b abuts or is hooked on the first extension portion 52b of the first fastening member 50.

Accordingly, while the second fastening member 60 is rolling up the sheet edge portion 7a of the second sheet member 7, the tip end portion of the first extension portion 52b can be pulled out of the insertion groove portion 62d of the second fastening member 60, and can be moved toward the abutment portion 62c of the second engagement portion 62. At the same time, a part (the first head portion) of the engagement head portion 62b can be brought closer to the opening portion 54 of the first fastening member 50 while in sliding contact with the top end surface of the first protrusion portion 52c.

Further, by rotating the second fastening member 60 toward the first fastening member 50, while elastically deforming at least one of the first fastening member 50 and the second fastening member 60, the engagement head portion 62b exceeds the first protrusion portion 52c and can be moved into the accommodation space portion 53. Accordingly, the entirety of the engagement head portion 62b can be easily and smoothly inserted and fitted into the accommodation space portion 53 of the first fastening member 50.

In this case, at the time when the engagement head portion 62b exceeds the first protrusion portion 52c, at least one of the first fastening member 50 and second fastening member 60, which has been elastically deformed, is elastically restored, and thus the engagement head portion 62b of the second fastening member 60 can be hooked on the inner wall surface of the first protrusion portion 52c.

Figure 20:
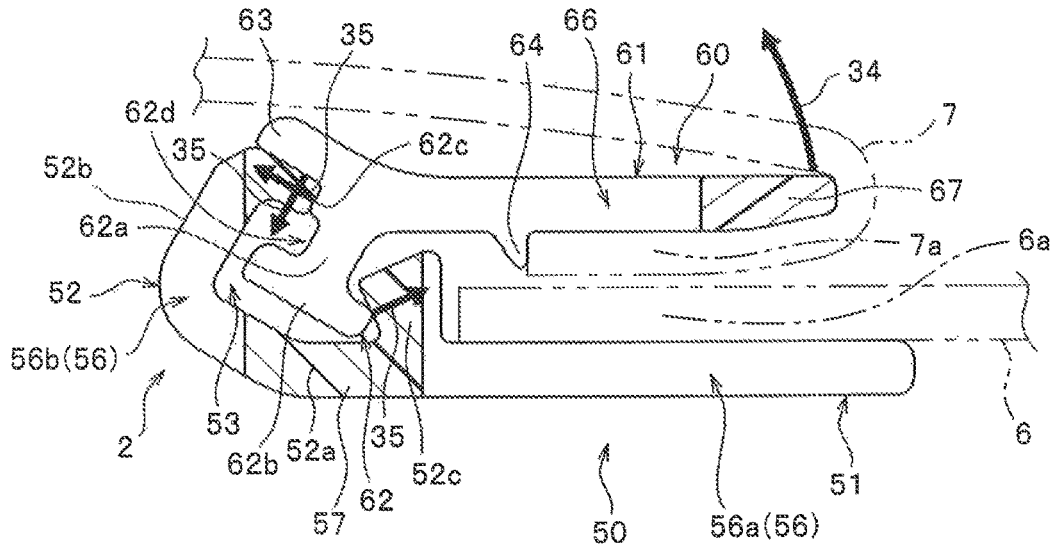
FIG. 20 is a cross-sectional view schematically illustrating a permanent engagement state of the sheet fastener according to the second embodiment.

Further, when the engagement head portion 62b exceeds the first protrusion portion 52c as described above, the above-described elastic return occurs. Then, the first fastening member 50 and the second fastening member 60 partially collide with each other, and such a collision can generate a small collision sound or a feel of touch. Therefore, as illustrated in FIG. 20, even in a case where the first fastening member 50 and the second fastening member 60 are respectively covered with the first sheet member 6 and the second sheet member 7 and cannot be seen from the outer side (upper side in the drawing), the operator is able to confirm that the entirety of the engagement head portion 62b has been inserted into the accommodation space portion 53 of the first fastening member 50 by sensing the small collision sound or the feel of touch.

Then, as described above, the entirety of the engagement head portion 62b is inserted and held in the accommodation space portion 53 of the first fastening member 50. Thus, as illustrated in FIGS. 11 and 20, a tip end edge of the first extension portion 52b of the first fastening member 50 and the abutment portion 62c of the second fastening member 60 abut each other, and the inner wall surface of the first protrusion portion 52c of the first fastening member 50 and the engagement head portion 62b of the second fastening member 60 abut each other. Furthermore, in the case of the present embodiment, the tip end portion of the first extension portion 52b of the first fastening member 50 and the protrusion piece portion 63 of the second fastening member 60 can be made to abut each other widely.

In this manner, since the second fastening member 60 abuts the first fastening member 50 at two or more locations, the second fastening member 60 can be stably engaged (fitted) with the first fastening member 50 in the permanent engagement state with an appropriate engagement force. Accordingly, the first fastening member 50 secured to the first sheet member 6 in the curved state is connected with the second fastening member 60 secured to the second sheet member 7 in the curved state. Therefore, as illustrated in FIG. 11, the sheet edge portion 7a, which is curved, of the second sheet member 7 can be continuously fastened with the sheet edge portion 6a, which is curved, of the first sheet member 6 along the longitudinal directions of the first fastening member 50 and the second fastening member 60.

Furthermore, in the case where the second fastening member 60 is engaged in the permanent engagement state as described above, the first fastening member 50 and the second fastening member 60, which are engaged with each other, receive the tensile strength to be respectively pulled from the first sheet member 6 and the second sheet member 7. Accordingly, the stress in a direction of rotating the second fastening member 60 to separate the second main body portion 61 of the second fastening member 60 from the first fastening member 50 is applied to the sheet fastener 2, as indicated by a fourth arrow 34 in FIG. 20.

In this case, the first fastening member 50 can receive the force to be applied from the second fastening member 60, as indicated by a fifth arrow 35 in FIG. 20, at the tip end edge of the first extension portion 52b, the inner wall surface of the first protrusion portion 52c, and an outer peripheral surface of the tip end portion of the first extension portion 52b, and can support the second fastening member 60. Accordingly, the second fastening member 60 can be prevented from being released from the first fastening member 50 effectively, and the permanent engagement state can be maintained stably.

Particularly in the case of the present embodiment, the inner wall surface of the first protrusion portion 52c is disposed at an acute inclination angle as described above with respect to the first surface of the first base end wall portion 52a. Therefore, as compared with, for example, the case where such an inclination angle is 90 degrees or an obtuse angle, the engagement head portion 62b of the second fastening member 60 can be more stably supported by the inner wall surface of the first protrusion portion 52c.

Figure 21:
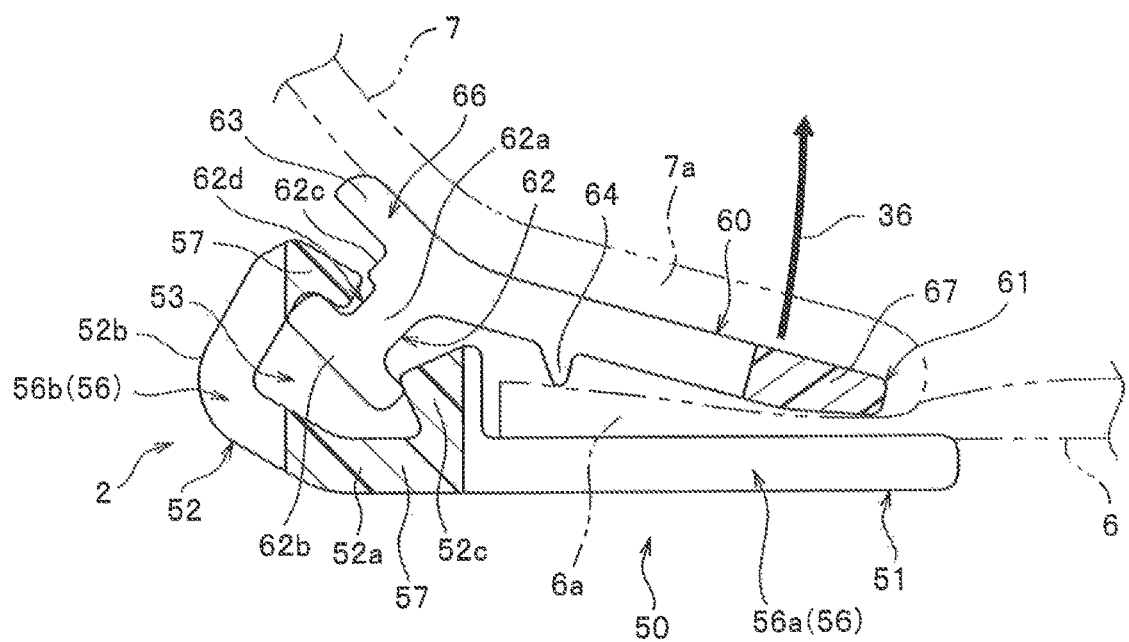
FIG. 21 is a cross-sectional view schematically indicating removal of the second fastening member according to the second embodiment.
Figure 22:
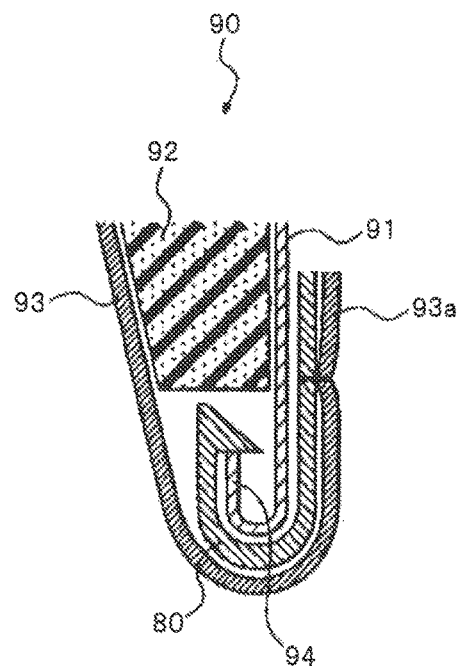
FIG. 22 is a cross-sectional view illustrating a conventional sheet cushion.
Figure 23:
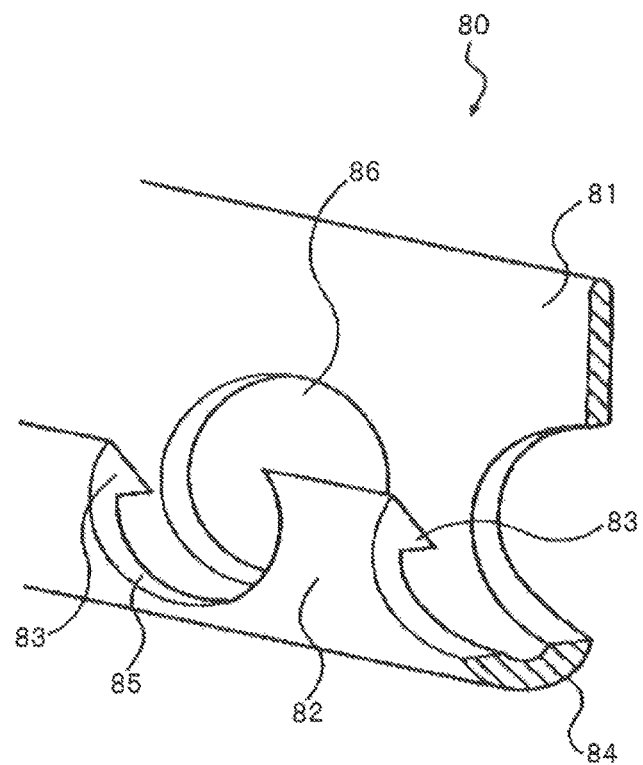
FIG. 23 is a perspective view illustrating a conventional trim cover attachment member.
Figure 24:
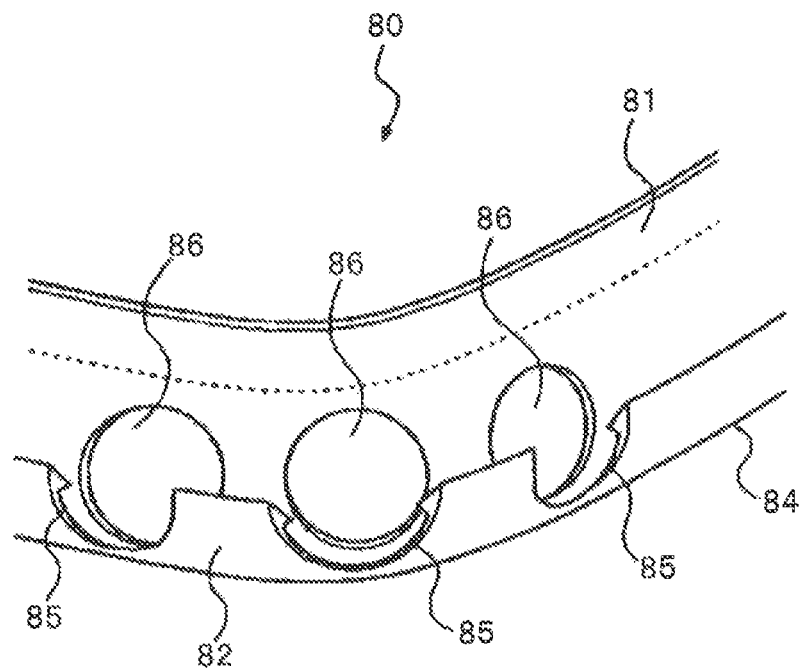
FIG. 24 is a perspective view illustrating a state where the conventional trim cover attachment member is curved.

On the other hand, as illustrated in FIGS. 11 and 20, in removing to separate the second fastening member 60 from the first fastening member 50 from the state where the second fastening member 60 is locked to the first fastening member 50 in the permanent engagement state, an operator holds the second fastening member 60, and moves the second fastening member 60 against the tensile strength from the first sheet member 6 and the second sheet member 7, so that the first extension portion 52*b* of the first fastening member 50 is separated from the abutment portion 62*c* and the protrusion piece portion 63 of the second fastening member 60 to be inserted into the insertion groove portion 62*d*, as illustrated in FIG. 21. Accordingly, the location of the second fastening member 60 is shifted from the permanent engagement state.

Subsequently, while keeping the state where the first extension portion 52*b* of the first fastening member 50 is inserted into the insertion groove portion 62*d*, the operator rotates the second fastening member 60 around a part of the engagement head portion 62*b* that abuts the first extension portion 52*b* of the first fastening member 50, as indicated by a sixth arrow 36 in FIG. 21. Accordingly, while elastically deforming at least one of the first fastening member 50 and the second fastening member 60, the engagement head portion 62*b* can be smoothly pulled out of the accommodation space portion 53 of the first fastening member 50, and the second fastening member 60 can be easily and smoothly detached from the first fastening member 50. As a result, the sheet edge portion 7*a* of the second sheet member 7 can be easily separated from the sheet edge portion 6*a* of the first sheet member 6.

As described above, in the sheet fastener 2 according to the present second embodiment, the plurality of first slit portions 56 are formed in the first fastening member 50, and the plurality of second slit portions 66 are formed in the second fastening member 60. Therefore, for example, as illustrated in FIG. 11, even in a case where the sheet edge portions 6*a* and 7*a* of the first sheet member 6 and the second sheet member 7 are formed to be curved with similar curvatures in the directions parallel to the respective sheet edge portions 6*a* and 7*a*, the first fastening member 50 and the second fastening member 60 can be curved correspondingly while keeping long-sized states, and can be stably secured to the respective sheet edge portions 6*a* and 7*a*.

Furthermore, by engaging the first fastening member 50 and the second fastening member 60, which are respectively secured in the curved states to the first sheet member 6 and the second sheet member 7 with each other in the permanent engagement state, the sheet edge portion 7*a*, which is curved, of the second sheet member 7 can be easily and smoothly fastened with the sheet edge portion 6*a*, which is curved, of the first sheet member 6, by a simple operation as described above in a short period of time. Further, also in the case of the sheet fastener 2 according to the present second embodiment, in the same manner as the case of the above-described first embodiment, neither the first fastening member nor the second fastening member is cut into small pieces as in the conventional case. Therefore, an uneven pattern caused by the small pieces of the first fastening member and the second fastening member is not generated. Therefore, degradation in the external appearance quality of a product resulting from the above-described uneven pattern can be prevented.

Further, in the sheet fastener 2 according to the present second embodiment, when the sheet edge portion 7*a* of the second sheet member 7 is fastened with the sheet edge portion 6*a* of the first sheet member 6, the second sheet member 7 is folded back in contact with the tip end portion of the second main body portion 61 of the second fastening member 60, as illustrated in FIG. 20. In this case, the second continuous portion 67 continuous in the longitudinal direction is provided at the tip end portion of the second main body portion 61 of the second fastening member 60. Accordingly, also in the second fastening member 60 according to the present second embodiment, in the same manner as the second fastening member 20 in the above-described first embodiment, the second sheet member 7 can be beautifully folded back along the second continuous portion 67. In addition, the folded-back part of the second sheet member 7 can be finished in a smooth form.

Furthermore, in the second fastening member 60 according to the present second embodiment, there is provided the protrusion piece portion 63, which protrudes from the second engagement portion 62 and which is abutted by the first engagement portion 52 of the first fastening member 50. On the other hand, in the first engagement portion 52 of the first fastening member 50 according to the present second embodiment, the above-described plurality of engagement side first slit portions 56*b* are arranged at the constant pitch interval P1. Hence, an uneven pattern is formed on the first engagement portion 52 by a part where the engagement side first slit portion 56*b* is arranged and a part where no engagement side first slit portion 56*b* is arranged.

In this case, for example, unless the above-described protrusion piece portion 63 is provided in the second fastening member 60, it is conceivable that the second sheet member 7 is pressed against the first engagement portion 52 of the first fastening member 50 by the tensile strength of the second sheet member 7, when the second fastening member 60 is held by the first fastening member 50 in the permanent engagement state. As a result, the above-described uneven pattern formed on the first engagement portion 52 of the first fastening member 50 may appear on the outer surface of the second sheet member 7.

In the present second embodiment, however, the protrusion piece portion 63 is provided on the second fastening member 60. The protrusion piece portion 63 of the second fastening member 60 is capable of abutting the first engagement portion 52 of the first fastening member 50, and covering a part of the first engagement portion 52 from above, when the second fastening member 60 is held by the first fastening member 50 in the permanent engagement state (refer to FIG. 20).

Accordingly, even in a case where the uneven pattern is formed in the first engagement portion 52 of the first fastening member 50 by the engagement side first slit portions 56*b* as described above, the protrusion piece portion 63 of the second fastening member 60 can make it difficult for the first engagement portion 52 of the first fastening member 50 to come into contact with the second sheet member 7. As a result, the uneven pattern formed on the first engagement portion 52 can be prevented from appearing on the outer surface of the second sheet member 7 (or the uneven pattern can become unlikely to appear on the outer surface of the second sheet member 7).

It is to be noted that the sheet fasteners 1 and 2 according to the above-described first and second embodiments can be used particularly suitably not only in the case where the sheet edge portion 6*a* of the first sheet member 6 and the sheet edge portion 7*a* of the second sheet member 7 are formed in curved forms in the directions parallel to the respective sheet edge portions 6*a* and 7*a*, but also, for example, in the case where the sheet edge portion of the first sheet member and the sheet edge portion of the second sheet member are respectively linearly formed. That is, by the use of the sheet fasteners 1 and 2 according to the first and second embodiments, the sheet edge portion 7a, which has a linear shape, of the second sheet member 7 can be fastened easily and smoothly with the sheet edge portion 6a, which has a linear shape, of the first sheet member 6.

REFERENCE SIGNS LIST 1, 2 sheet fastener
5 cushion body
6 first sheet member
6a sheet edge portion
7 second sheet member
7a sheet edge portion
10 first fastening member
11 first main body portion
11a first surface (secured surface)
11b second surface
12 first engagement portion
12a first base end wall portion
12b first intermediate wall portion
12c first tip end wall portion
12d first protrusion portion
13 accommodation space portion
14 opening portion
14a size of opening portion
16 first slit portion
16a main body side first slit portion
16b engagement side first slit portion
16c slit end face
17 first continuous portion
18 opening adjacent end portion
20 second fastening member
21 second main body portion
21a first surface (secured surface)
21b second surface
22 second engagement portion
22a second base end wall portion
22b second intermediate wall portion
22c second tip end wall portion
23 inner space portion
26 second slit portion
27 second continuous portion
31 to 36 first arrow to sixth arrow
50 first fastening member
51 first main body portion
51a first surface (secured surface)
51b second surface
52 first engagement portion
52a first base end wall portion
52b first extension portion
52c first protrusion portion
53 accommodation space portion
54 opening portion
54a size of opening portion
56 first slit portion
56a main body side first slit portion
56b engagement side first slit portion
56c slit end face
57 first continuous portion
58 opening adjacent end portion
60 second fastening member
61 second main body portion
61a first surface (secured surface)
61b second surface
62 second engagement portion
62a neck portion
62b engagement head portion
62c abutment portion
62d insertion groove portion
63 protrusion piece portion
64 positioning protrusion portion
66 second slit portion
67 second continuous portion
D1 first slit separation interval
D2 second slit separation interval
L length from insertion groove portion of second fastening member to end portion of engagement head portion on second main body portion side
P1, P2 pitch interval
W1 first slit width dimension
W2 second slit width dimension
W3 groove width dimension of insertion groove portion
θ angle between inner wall surface of first protrusion portion and first surface of first base end wall portion

The invention claimed is:

1. A sheet fastener comprising:
a first fastening member having a long size and configured to be secured to a sheet edge portion of a first sheet member; and
a second fastening member having a long size and configured to be secured to a sheet edge portion of a second sheet member,
wherein the second fastening member is engaged with the first fastening member to enable the second sheet member to be fastened with the first sheet member, the first fastening member comprising:
a first main body portion including a secured surface being flat and configured to be secured to the first sheet member;
a first engagement portion integrally provided at an end portion of the first main body portion and configured to accommodate and engage a part of the second fastening member in an inside;
a plurality of first slit portions formed along an intersecting direction that intersects a longitudinal direction of the first fastening member; and
a first continuous portion continuous along the longitudinal direction of the first fastening member, and
wherein a plurality of the first slit portions are arranged such that the first fastening member is enabled to curve in a direction parallel to the secured surface of the first main body portion.

2. The sheet fastener according to claim 1,
wherein the second fastening member comprises:
a second main body portion including a secured surface being flat and configured to be secured to the second sheet member;
a second engagement portion extending from an end portion of the second main body portion and configured to be engaged with the first engagement portion;
a plurality of second slit portions formed along an intersecting direction that intersects a longitudinal direction of the second fastening member; and
a second continuous portion continuous along the longitudinal direction of the second fastening member, and
wherein a plurality of the second slit portions are arranged such that the second fastening member is enabled to curve in a direction parallel to the secured surface of the second main body portion.

3. A sheet fastener comprising:
a first fastening member having a long size and configured to be secured to a sheet edge portion of a first sheet member; and
a second fastening member having a long size and configured to be secured to a sheet edge portion of a second sheet member,
wherein the second fastening member is engaged with the first fastening member to enable the second sheet member to be fastened with the first sheet member, the second fastening member comprising:
a second main body portion including a secured surface being flat and configured to be secured to the second sheet member;
a second engagement portion extending from an end portion of the second main body portion and configured to be engaged with the first fastening member;
a plurality of second slit portions formed along an intersecting direction that intersects a longitudinal direction of the second fastening member; and
a second continuous portion continuous along the longitudinal direction of the second fastening member, and
wherein a plurality of the second slit portions are arranged such that the second fastening member is enabled to curve in a direction parallel to the secured surface of the second main body portion.

4. The sheet fastener according to claim 3,
wherein the first fastening member comprises:
a first main body portion including a secured surface being flat and configured to be secured to the first sheet member;
a first engagement portion integrally provided at an end portion of the first main body portion and configured to accommodate and engage a part of the second engagement portion in an inside;
a plurality of first slit portions formed along an intersecting direction that intersects a longitudinal direction of the first fastening member; and
a first continuous portion continuous along the longitudinal direction of the first fastening member, and
wherein a plurality of the first slit portions are arranged such that the first fastening member is enabled to curve in a direction parallel to the secured surface of the first main body portion.

5. The sheet fastener according to claim 2,
wherein, in a case where a first slit width dimension represents a dimension in the longitudinal direction of the first slit portion, a first slit separation interval represents a distance between the first slit portions adjacent to each other in the longitudinal direction, a second slit width dimension represents a dimension in the longitudinal direction of the second slit portion, and a second slit separation interval represents a distance between the second slit portions adjacent to each other in the longitudinal direction, the first slit width dimension is smaller than the second slit separation interval and the second slit width dimension is smaller than the first slit separation interval.

6. The sheet fastener according to claim 5,
wherein the first slit width dimension is smaller than the second slit separation interval in 50% or more of the first slit portions, and the second slit width dimension is smaller than the first slit separation interval in 50% or more of the second slit portions.

7. The sheet fastener according to claim 2,
wherein a plurality of the first slit portions and a plurality of the second slit portions are respectively formed in the longitudinal directions of the first fastening member and the second fastening member at a pitch interval that is constant, and
wherein the pitch interval of the first slit portion and the pitch interval of the second slit portion are an identical size.

8. The sheet fastener according to claim 2,
wherein the first engagement portion of the first fastening member has a substantially letter U shape or a substantially letter C shape in a transverse section perpendicular to the longitudinal direction of the first fastening member, and
wherein, in the first engagement portion, an accommodation space portion arranged in the inside of the first engagement portion and configured to accommodate at least a part of the second engagement portion and an opening portion configured to communicate with the accommodation space portion are provided along the longitudinal direction of the first fastening member.

9. The sheet fastener according to claim 8,
wherein the first continuous portions of the first fastening member are adjacent to the opening portion in the first engagement portion and are provided in at least a pair of opening adjacent end portions disposed to face each other via the opening portion.

10. The sheet fastener according to claim 2,
wherein, when the first fastening member is viewed from a direction perpendicular to the secured surface of the first main body portion, the first slit portions comprise:
a plurality of main body side first slit portions formed continuously along the intersecting direction from an end edge on a side where the first main body portion is disposed in the first fastening member; and
a plurality of engagement side first slit portions formed continuously along the intersecting direction from an end edge on a side where the first engagement portion is disposed in the first fastening member, and
wherein a plurality of the main body side first slit portions and a plurality of the engagement side first slit portions are formed at identical locations to each other in the longitudinal direction of the first fastening member.

11. The sheet fastener according to claim 2,
wherein, when the second fastening member is viewed from a direction perpendicular to the secured surface of the second main body portion, the second continuous portion is provided at an end edge portion on a side where the second main body portion is disposed in the second fastening member, and the second slit portions are continuously formed along the intersecting direction from an end edge on a side where the second engagement portion is disposed in the second fastening member.

12. The sheet fastener according to claim 2,
wherein the second engagement portion of the second fastening member has a substantially letter U shape in a transverse section perpendicular to the longitudinal direction of the second fastening member, and the second engagement portion comprises:
a second base end wall portion bending and extending from the second main body portion
a second intermediate wall portion bending and extending from the second base end wall portion; and
a second tip end wall portion bending and extending from the second intermediate wall portion.

13. The sheet fastener according to claim 4,
wherein, in a case where a first slit width dimension represents a dimension in the longitudinal direction of the first slit portion, a first slit separation interval represents a distance between the first slit portions adjacent to each other in the longitudinal direction, a second slit width dimension represents a dimension in the longitudinal direction of the second slit portion, and a second slit separation interval represents a distance between the second slit portions adjacent to each other in the longitudinal direction, the first slit width dimension being smaller than the second slit separation interval and the second slit width dimension being smaller than the first slit separation interval.

14. The sheet fastener according to claim 13,
wherein the first slit width dimension is smaller than the second slit separation interval in 50% or more of the first slit portions, and the second slit width dimension is smaller than the first slit separation interval in 50% or more of the second slit portions.

15. The sheet fastener according to claim 4,
wherein a plurality of the first slit portions and a plurality of the second slit portions are respectively formed in the longitudinal directions of the first fastening member and the second fastening member at a pitch interval that is constant, and
wherein the pitch interval of the first slit portion and the pitch interval of the second slit portion are an identical size.

16. The sheet fastener according to claim 4,
wherein the first engagement portion of the first fastening member has a substantially letter U shape or a substantially letter C shape in a transverse section perpendicular to the longitudinal direction of the first fastening member, and
wherein, in the first engagement portion, an accommodation space portion arranged in the inside of the first engagement portion and configured to accommodate at least a part of the second engagement portion and an opening portion configured to communicate with the accommodation space portion are provided along the longitudinal direction of the first fastening member.

17. The sheet fastener according to claim 16,
wherein the first continuous portions of the first fastening member are adjacent to the opening portion in the first engagement portion, and are provided in at least a pair of opening adjacent end portions disposed to face each other via the opening portion.

18. The sheet fastener according to claim 4,
wherein, when the first fastening member is viewed from a direction perpendicular to the secured surface of the first main body portion, the first slit portions comprise:
a plurality of main body side first slit portions formed continuously along the intersecting direction from an end edge on a side where the first main body portion is disposed in the first fastening member; and
a plurality of engagement side first slit portions formed continuously along the intersecting direction from an end edge on a side where the first engagement portion is disposed in the first fastening member, and
wherein a plurality of the main body side first slit portions and a plurality of the engagement side first slit portions are formed at identical locations to each other in the longitudinal direction of the first fastening member.

19. The sheet fastener according to claim 3,
wherein, when the second fastening member is viewed from a direction perpendicular to the secured surface of the second main body portion, the second continuous portion is provided at an end edge portion on a side where the second main body portion is disposed in the second fastening member and the second slit portions are continuously formed along the intersecting direction from an end edge on a side where the second engagement portion is disposed in the second fastening member.

20. The sheet fastener according to claim 3,
wherein the second engagement portion of the second fastening member has a substantially letter U shape in a transverse section perpendicular to the longitudinal direction of the second fastening member and the second engagement portion comprises:
a second base end wall portion bending and extending from the second main body portion;
a second intermediate wall portion bending and extending from the second base end wall portion; and
a second tip end wall portion bending and extending from the second intermediate wall portion.

* * * * *